United States Patent
Kerr et al.

(10) Patent No.: US 7,024,082 B2
(45) Date of Patent: Apr. 4, 2006

(54) APPARATUS AND METHOD FOR FORMING AN OPTICAL CONVERTER

(75) Inventors: Roger S. Kerr, Brockport, NY (US); Ronald S. Cok, Rochester, NY (US); David Kessler, Rochester, NY (US); Cheryl J. Kaminsky, Rochester, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/439,754

(22) Filed: May 16, 2003

(65) Prior Publication Data

US 2004/0234188 A1    Nov. 25, 2004

(51) Int. Cl.
G02B 6/44    (2006.01)

(52) U.S. Cl. .............. 385/114; 385/115; 385/121

(58) Field of Classification Search ......... 385/114–121
See application file for complete search history.

(56) References Cited

U.S. PATENT DOCUMENTS

| | | | |
|---|---|---|---|
| 3,033,731 A | 5/1962 | Cole | |
| 3,989,578 A | 11/1976 | Hashimoto | |
| 5,009,475 A * | 4/1991 | Knudson | 385/116 |
| 5,204,927 A | 4/1993 | Chin et al. | |
| 5,206,761 A * | 4/1993 | Ogino | 359/457 |
| 5,225,166 A | 7/1993 | Zarian et al. | |
| 5,376,201 A | 12/1994 | Kingstone | |
| 5,465,315 A | 11/1995 | Sakai et al. | |
| 5,534,101 A | 7/1996 | Keyworth et al. | |
| 5,548,013 A * | 8/1996 | Fujii et al. | 524/449 |
| 5,572,034 A | 11/1996 | Karellas | |
| 5,615,294 A | 3/1997 | Castonguay | |
| 5,938,812 A | 8/1999 | Hilton, Sr. | |
| 5,943,463 A * | 8/1999 | Unuma et al. | 385/119 |
| 6,195,016 B1 | 2/2001 | Shankle et al. | |
| 6,418,254 B1 | 7/2002 | Shikata et al. | |
| 6,511,615 B1 | 1/2003 | Dawes et al. | |
| 2002/0168157 A1 | 11/2002 | Walker et al. | |

FOREIGN PATENT DOCUMENTS

| | | |
|---|---|---|
| EP | 0 312 267 A2 | 5/1989 |
| JP | 58-116505 | 11/1983 |
| WO | WO 02/391555 | 5/2002 |

OTHER PUBLICATIONS

Michael T. Gale et al., "Replicated Microstructures for Integrated Optics", Proceedings of SPIE, vol. 2213, 1994, pp. 2-10, XP000600369, ISSN 0277-786X.

Michael T. Gale, "Replication Techniques for Diffractive Optical Elements", Microelectronic Engineering, vol. 34, 1997, pp. 321-339, XP004108296, ISSN 0167-9317.

* cited by examiner

*Primary Examiner*—Leonidas Boutsikaris
(74) *Attorney, Agent, or Firm*—Roland R. Schindler, II

(57) ABSTRACT

An optical converter and method for making same is provided. In accordance with the method, the present invention provides an improved apparatus and methods for fabrication of an optical converter. In one aspect of the invention a method for forming an optical converter is provided. In accordance with this method at least two light guide ribbon structures are provided, with each light guide ribbon structure formed by the steps of roll molding a substrate having a pattern of channels with each channel extending from an input edge to an output edge of said substrate and forming light guides extending along each of the channels from the input edge to the output edge. The at least two light guide ribbon structures are assembled in a stacked arrangement.

9 Claims, 18 Drawing Sheets

APPARATUS AND METHOD FOR FORMING AN OPTICAL CONVERTER

CROSS REFERENCE TO RELATED APPLICATIONS

This application is related to the following commonly assigned U.S. patent application Ser. No. 10/314,843 entitled "Optical Computer Formed From Flexible Strips" and U.S. patent application Ser. No. 10/314,557 entitled "An Apparatus and System For Forming a Fiber Optic Faceplate" both filed on Dec. 9, 2002.

FIELD OF THE INVENTION

This invention generally relates to fabrication of optical converters for use in imaging systems and more particularly relates to an apparatus and method for forming an optical converter on a substrate.

BACKGROUND OF THE INVENTION

One advantage of electronic display systems is the capability to display an image in a variety of formats and sizes. There is particular interest in providing large scale displays, visible to thousands of viewers over considerable distance, such as would be useful for entertainment and advertising. One known method for providing large-scale electronic displays is tiling, in which a matrix of smaller displays are linked together to form a larger display surface.

Image-forming devices such as LCDs, matrixed LEDs, Organic Light Emitting Diodes (OLEDs), and Polymer Light Emitting Diodes (PLEDs) provide a two dimensional image in pixel form, with pixels familiarly arranged in rows and columns. A recognized problem for displays using these components relates to inherent dimensional limitations of the electronic image-forming components themselves. Size and packaging requirements for these devices constrain their use in large-scale display applications, requiring special methods and techniques for image enlargement and tiling.

Optical converters, typically comprising arrays of optical fibers, have been recognized as a means for enlarging an electronically generated image in order to display the image in a larger format, such as for tiling applications. For example, U.S. Pat. No. 6,195,016 entitled Fiber Optic Display System with Enhanced Light Efficiency, filed Feb. 27, 2001, by Shankle et al. discloses an enlarged display using images provided from conventional transparencies, visibly enlarged by means of fiber optic light guides, each fiber painstakingly routed from the image forming device to a display panel. Similarly U.S. Pat. No. 6,418,254 entitled Fiber-Optic Display, filed Jul. 9, 2002, by Shikata et al. discloses a fiber optic display coupled with an image projector. U.S. Pat. No. 6,304,703 entitled Tiled Fiber Optic Display Apparatus, filed Oct. 16, 2001, by Lowry discloses a tiling implementation using bundles of optical fibers routed from image-forming components to a display apparatus.

As an alternative to routing individual fibers, symmetrically fixed groupings of optical fibers are preferred. For example, U.S. Pat. No. 5,465,315 entitled Display Apparatus Having A Plurality of Display Devices filed Nov. 7, 1995 by Sakai et al. discloses a tiled display employing LCD devices, with images tiled on a display surface using a fiber optic faceplate. Fiber optic faceplates have also been disclosed for use in a number of other applications, such as U.S. Pat. No. 5,572,034 entitled Fiber Optic Plates For Generating Seamless Images, filed Nov. 5, 1996 by Karellas which discloses tiling using fiber optic faceplates in an X-ray imaging apparatus and U.S. Pat. No. 5,615,294 entitled Apparatus For Collecting Light and It's Method of Manufacture, filed Mar. 25, 1997 by Castonguay which discloses use of a tapered fiber optic faceplate in light-sensing instrumentation.

Fiber optic faceplates that are commercially available are well suited for many types of image-sensing and instrumentation purposes. However, the overall requirements for using fiber optic faceplates for electronic image display are more demanding, particularly when used with LCD, LED, OLED, or PLED devices. In such a case, it is important to have precise positioning of optical fibers at the input and output sides of a fiber optic faceplate. That is, each pixel at the image-forming device has a corresponding fiber light guide within the fiber optic faceplate that directs light from that pixel to the output display surface. This requirement necessitates custom design of a fiber optic faceplate for the geometry of the image forming device itself (such as for an OLED, for example) and for the geometry of the display surface. It can be appreciated that tiling arrangements introduce even more complexity into the faceplate fabrication problem. As a result, fiber optic faceplates suitable for electronic image display continue to be costly and difficult to fabricate. Solutions for fiber optic faceplate fabrication, such as those disclosed in International Application WO 02/39155 (Cryan et al.) can be highly dependent on accurate dimensions of the optical fiber or of interstitial fillers used to provide a precise spacing between fibers.

One prior art approach for providing accurate positioning of optical fibers in a fiber bundle is disclosed in U.S. Pat. No. 3,989,578 entitled Apparatus For Manufacturing Optical Fiber Bundle, filed Nov. 2, 1976, by Hashimoto, hereinafter termed the '578 patent. In the method of the '578 patent, directed to the manufacture of fiberscope apparatus, optical fiber is wound around a mandrel and aligned in guide frames to obtain precise positioning. In U.S. Pat. No. 5,938,812 entitled Method for Constructing A Coherent Imaging Bundle, filed Aug. 17, 1999 by Hilton, Sr., hereinafter termed the '812 patent, a multilayer fiber optic bundle is fabricated by winding a fiber optic strand around a drum, within a plastic channel. In U.S. Pat. No. 3,033,731 entitled Method For The Manufacture Of Optical Image-Transfer Devices, filed Mar. 6, 1958, by Cole, hereinafter termed the '731 patent, fiber is wound about a mandrel to form rows, which can then be combined to build up a fiber structure. Thus, it can be seen that a drum or mandrel, properly dimensioned, can be a suitable apparatus for positional arrangement of optical fibers in a bundle. However, neither the '578, '812, nor '731 patents provide a suitable solution for optical fiber faceplate fabrication. The methods used in the above-mentioned patents position fibers adjacently, so that the dimensions of the fiber itself determine center-to-center spacing of the fiber bundle. However, such methods are highly dependent on the uniformity of fiber dimensions. In actual practice, however, the actual dimensions of optical fiber can vary widely, even for the same type of fiber. Additional tolerance error is due to winding tension differences as the fiber strands are wound about the drum. More significantly, however, the methods of the '578, '812, and '731 patents do not provide a way to vary the center-to-center distances between fibers, both at input and at output ends of the fiber bundle. As is noted earlier, the capability for varying the center-to-center distance between fibers, lacking with the methods of the '578, '812, and '731 patents, is of paramount importance for display imaging applications.

In an attempt to meet the requirements for variable center-to-center spacing, U.S. Pat. No. 5,204,927 (Chin et al.), hereinafter termed the '927 patent, discloses the use of pairs of axially disposed spacer bars. The use of spacer bars allows a fiber optic bundle to have different fiber spacing at input and output ends. Similarly, U.S. Pat. No. 5,376,201 entitled Method of Manufacturing An Image Magnification Device, filed Dec. 27, 1994, by Kingstone hereinafter termed the '201 patent, discloses the use of spacer guides in a rotating drum application for output fiber spacing, where the output spacer guides, added as each layer of fiber is formed, become part of the completed fiber bundle assembly.

While the '927 and '201 disclosures suggest helpful fabrication techniques for fiber optic couplers, there is felt to be considerable room for improvement. In particular, neither the '927 nor the '201 disclosure are well suited to the requirements for accurate, high-speed, and inexpensive fabrication of fiber optic faceplates as the type of optical converter needed for electronic display imaging. With respect to both '927 and '201 disclosures, curvature effects of the rotating drum constrain the attainable size of a fiber optic faceplate built up in this way. Continuous feeding of optical fiber is necessary, which suggests a substantial amount of waste with the '927 and '201 methods. The method of the '201 disclosure relies heavily on precision manufacture of grooved spacer components, incorporated into the body of the fiber faceplate itself, used to define the spacing of each output row and to set the spacing between rows. Moreover, new spacers are required to be accurately positioned as each row of fibers is wound. This adds cost and complexity to the fabrication process.

U.S. Patent Application Publication 2002/0168157 (Walker et al.) discloses a method for fabrication of a fiber optic faceplate made from stacked sheets of optical fibers, where the sheets are formed using co-extrusion of fiber optic material through a specially designed die. These flat sheet structures can be stacked and bonded together, either using heat or some other means, to form a composite structure, which can be up to a few meters in length, comprising parallel lengths of optical fiber that extend down the length of the composite structure. This composite structure is then cross-sectioned to obtain individual fiber optic faceplates of a selectable thickness. Although this method provides some advantages for mass manufacture of fiber optic faceplates, significant drawbacks remain. For example, the extrusion method of the Publication 2002/0168157 disclosure (the '157 disclosure) maintains a consistent spacing between optical fibers as they are formed; this method is not designed to allow varying the spacing between optical fibers at different points along their lengths. The optical fibers in the faceplate obtained with this method have the same center-to-center spacing throughout the structure. In order to obtain different effective center-to-center spacing for a fiber optic faceplate, input side to output side, the method of the '157 disclosure requires sectioning the composite structure of bonded fibers at an oblique angle. This rigidly constrains the number of possible center-to-center spacing arrangements that can be obtained from any one production run. Using the method of the '157 disclosure has further disadvantages with respect to sizing constraints. The maximum dimensions of a fiber optic faceplate using '157 disclosure techniques is rigidly determined by the width of an extrusion die; obtaining a larger width structure requires building a larger extrusion die and scaling up the supporting mechanical subsystems, at costs which could easily be prohibitive. Spacing between stacked sheets, in a direction orthogonal to the row direction, is not easily varied using the methods of the '157 disclosure, limiting the range of spacing dimensions that can be obtained. Cross-sectional diameters of the component optical fibers cannot be reliably varied from the input side of the fiber optic faceplate to the output side.

As the above examples illustrate, conventional methods for forming optical converters as fiber optic faceplates are based on various techniques such as assembling individual optical fibers into a faceplate structure, characteristically using winding or stitching operations or extruding rows of optical fibers into sheets for stacking, bonding, and cross-sectioning. Given the difficulties, costs and limitations inherent when using optical fibers as light guides, it can be appreciated that alternative methods for providing an optical converter at reduced cost and having added flexibility would be beneficial.

Overall, it can be seen that there is a need for improved methods for fabrication of optical converters, particularly for electronic imaging applications.

SUMMARY OF THE INVENTION

The present invention provides an improved apparatus and methods for fabrication of an optical converter. In one aspect of the invention a method for forming an optical converter is provided. In accordance with this method at least two light guide ribbon structures are provided, with each light guide ribbon structure formed by the steps of roll molding a substrate having a pattern of channels with each channel extending from an input edge to an output edge of said substrate and forming light guides extending along each of the channels from the input edge to the output edge. The at least two light guide ribbon structures are assembled in a stacked arrangement.

In another aspect of the invention, a method is provided for forming an optical converter. In accordance with the method a web of light guide ribbon structures is formed by the steps of roll molding a web substrate having a pattern of channels, each channel spaced apart from its adjacent channel in accordance with a predefined pattern, and coating an optical material into the channels on the web of substrate to form light guides, and segmenting the web of light guide ribbon structures to form individual light guide ribbon structures with each ribbon structure having an input edge and an output edge with light guides extending therebetween. The individual light guide ribbon structures are assembled in a stacked arrangement.

In still another aspect of the invention, a method is provided for forming an optical converter. In accordance with the method an initial web layer of light guide ribbon structures is formed by the steps of roll molding a web of substrate having a pattern of channels each channel spaced apart from its adjacent channel in accordance with a predefined pattern and coating an optical material into the channels on the web of substrate to form light guides. At least one subsequent web layer of light guide ribbon structure is formed on the initial web layer by the steps of roll molding a web of substrate on the initial web layer of light guide ribbon structures, with each subsequent layer having a pattern of channels each channel spaced apart from its adjacent channel in accordance with a predefined pattern and coating an optical material into the channels on the web of substrate to form light guides and segmenting the web of light guide ribbon structure to form an optical converter having an input edge and an output edge with an array of stacked light guides extending therebetween.

In another aspect of the invention, an optical converter is provided. The optical converter has at least two light guide ribbon structures assembled in a stacked arrangement with each light guide ribbon structure formed by the steps of roll molding a substrate having a pattern of channels with each channel extending from an input edge of the substrate to an output edge of said substrate and forming light guides extending along each of the channels from the input edge to the output edge.

In still another aspect of the invention, an optical converter is provided. The optical converter has individual light guide ribbon structures assembled in a stacked arrangement with each light guide ribbon structure formed by the steps of roll molding a web of substrate having a pattern of channels each channel spaced apart from its adjacent channel in accordance with a predefined pattern and coating an optical material into the channels on the web of substrate to form light guides and segmenting the web of light guide ribbon structures to form individual light guide ribbon structures with each ribbon structure having an input edge and an output edge with light guides extending therebetween.

In still another aspect of the invention, an optical converter is provided. The optical converter has an input edge and an output edge with an array of stacked light guides extending therebetween with the optical converter having an initial web layer of light guide ribbon structures formed by the steps of roll molding a web of substrate having a pattern of channels each channel spaced apart from its adjacent channel in accordance with a predefined pattern and coating an optical material into the channels on the web of substrate to form light guides and at least one subsequent web layer of light guide ribbon structure on the initial web layer formed by the steps of roll molding a web of substrate on the initial web layer of light guide ribbon structures, with each subsequent layer having a pattern of channels, each channel spaced apart from its adjacent channel in accordance with a predefined pattern, and coating an optical material into the channels on the web of substrate to form light guides.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Substrate Formation

Figure 1:
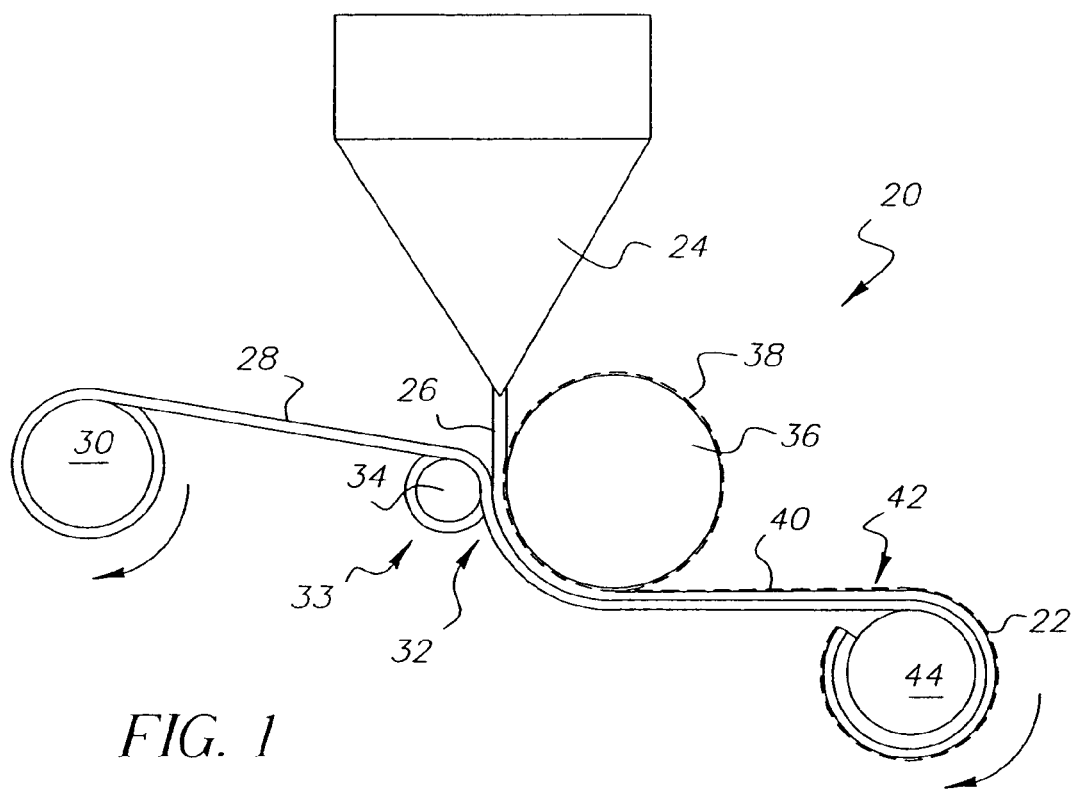
FIG. 1 shows a first embodiment of an extrusion roll molding apparatus.
Figure 2:
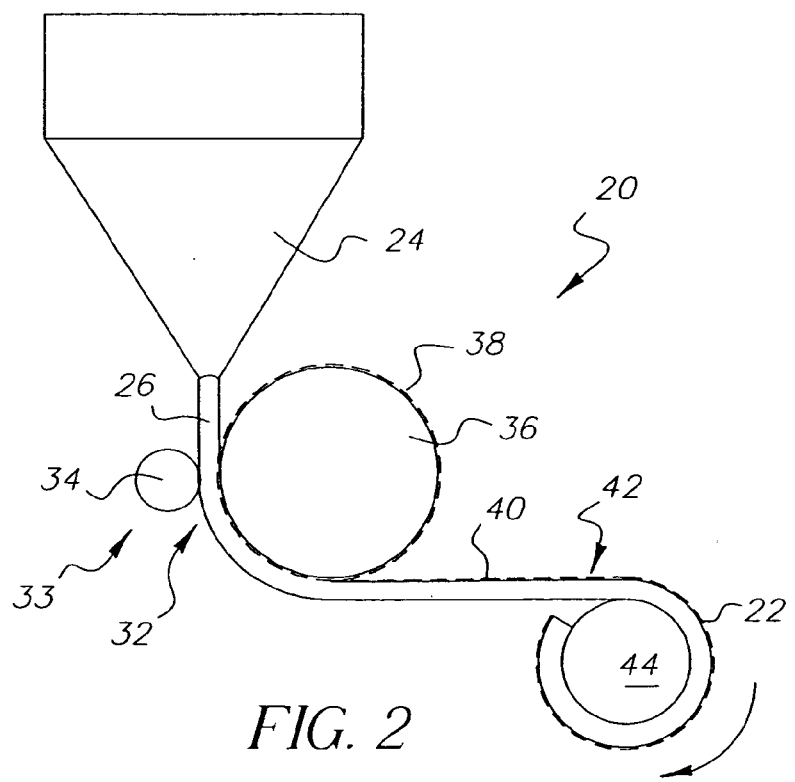
FIG. 2 shows another embodiment of an extrusion roll molding apparatus.

The medium of the present invention is formed using a substrate having a pattern of raised areas and channels. FIGS. 1 and 2 show alternative embodiments for the formation of such a substrate.

FIG. 1 shows a schematic illustration of an overall arrangement of one embodiment of an extrusion roll molding apparatus 20 for fabricating a substrate 22. In this embodiment, an extruder 24 provides a thermoplastic material 26, such as a polymer, onto a base 28 that can be formed from the same material as thermoplastic material 26 or that can be formed from different materials such as papers, films, fabrics or other useful base materials. Base 28 is fed from a base supply roll 30. Thermoplastic material 26 and base 28 pass into a nip area 32 between a support 33 shown in FIG.

1 as a pressure roller 34 and a pattern roller 36. As thermoplastic material 26 passes through nip area 32, support 33 and pattern roller 36 press the thermoplastic material 26 onto base 28 and a roller pattern 38 of raised surfaces and channels (not shown) on pattern roller 36 is impressed into thermoplastic material 26. When roller pattern 38 is impressed into thermoplastic material 26 some of the melted thermoplastic material 26 fills channels (not shown) in roller pattern 38 to form raised areas (not shown) on a patterned surface 42 of substrate 22 and the balance of thermoplastic material 26 is squeezed onto base 28 forming channels (not shown). Accordingly, this forms a channel pattern 40 having channels separated by raised areas on a patterned surface 42 of thermoplastic material 26. The arrangement of raised areas and channels in channel pattern 40 is the negative of the arrangement of raised areas and channels found on roller pattern 38. Thermoplastic material 26 is then cooled below a melting temperature of thermoplastic material 26 or otherwise cured and substrate 22 is then wound onto a substrate take up roll 44 for further processing as will be described in greater detail below.

FIG. 2 shows another embodiment of an extrusion roll molding apparatus 20 that can be used to form substrate 22. In the embodiment of FIG. 2, extrusion roll molding apparatus 20 comprises an extruder 24 that melts thermoplastic material 26. Melted thermoplastic material 26 supplied by extruder 24 is pressed into nip area 32 between support 33 and pattern roller 36. Melted thermoplastic material 26 passes material between support 33 and pattern roller 36 and is cooled below the melting temperature of thermoplastic material 26 to form substrate 22. As melted thermoplastic material 26 is passed through nip area 32 to form substrate 22, a roller pattern 38 on pattern roller 36 is impressed into melted thermoplastic material 26 to form a channel pattern 40 of channels (not shown) separated by raised areas (not shown) on patterned surface 42 of substrate 22 that is the negative of pattern roller 36. Substrate 22 is then wound onto a substrate take up roll 44 for further processing as will be described in greater detail below.

In the embodiment shown, pattern roller 36 comprises a metallic roller such as chrome, copper or stainless steel into which roller pattern 38 is formed. However, in other embodiments, pattern roller 36 can comprise a variety of forms. For example, pattern roller 36 can comprise any type of dimensionally stable roller, drum, belt or other surface that is adapted so that a metallic plate, sleeve or other structure (not shown) having roller pattern 38 formed thereon that can be joined to pattern roller 36 to provide a metallic contact surface having the desired roller pattern 38. This allows the same pattern roller 36 to be used in conjunction with many different roller patterns simply by changing the sleeve, metallic plate or other structure having roller pattern 38.

Forming roller pattern 38 on a metallic pattern roller 36 or metallic plate, metallic sleeve or other metallic structure that can be joined to pattern roller 36, provides protection to the precision geometry of roller pattern 38, provides excellent mechanical wear properties and is an excellent conductor of heat and pressure. Roller pattern 38 can be formed on pattern roller 36, a plate, sleeve or other structure by known machining techniques, including but not limited to, techniques such as machining the desired pattern directly into the roller surface utilizing wire electrical discharge machining tools, etching the pattern directly into the roller, growing the pattern by use of photolithography, machining the pattern using high energy lasers, diamond milling, ion beam milling or creation of a random pattern by bead blasting the roller followed by chrome plating.

In alternative embodiments, pattern roller 36 or a plate, sleeve or other structure bearing roller pattern 38 can be formed using other non-metallic materials. For example pattern roller 36 can be formed from materials such as ceramics or certain plastics. Roller pattern 38 can be formed in such materials using known techniques including, but not limited to, casting, oblation, ion beam milling, printing and lithographic techniques such as gray scale lithography.

In another alternative embodiment, support 33 can take other forms such as a belt, platen or other structure capable of providing sufficient support so that pattern roller 36 can be impressed into thermoplastic material 26 to form channel pattern 40. Similarly, the pattern roller 36 can also alternatively comprise other structures such as a belt, a reciprocating belt system or other movable surface onto which a roller pattern can be formed.

Figure 3:
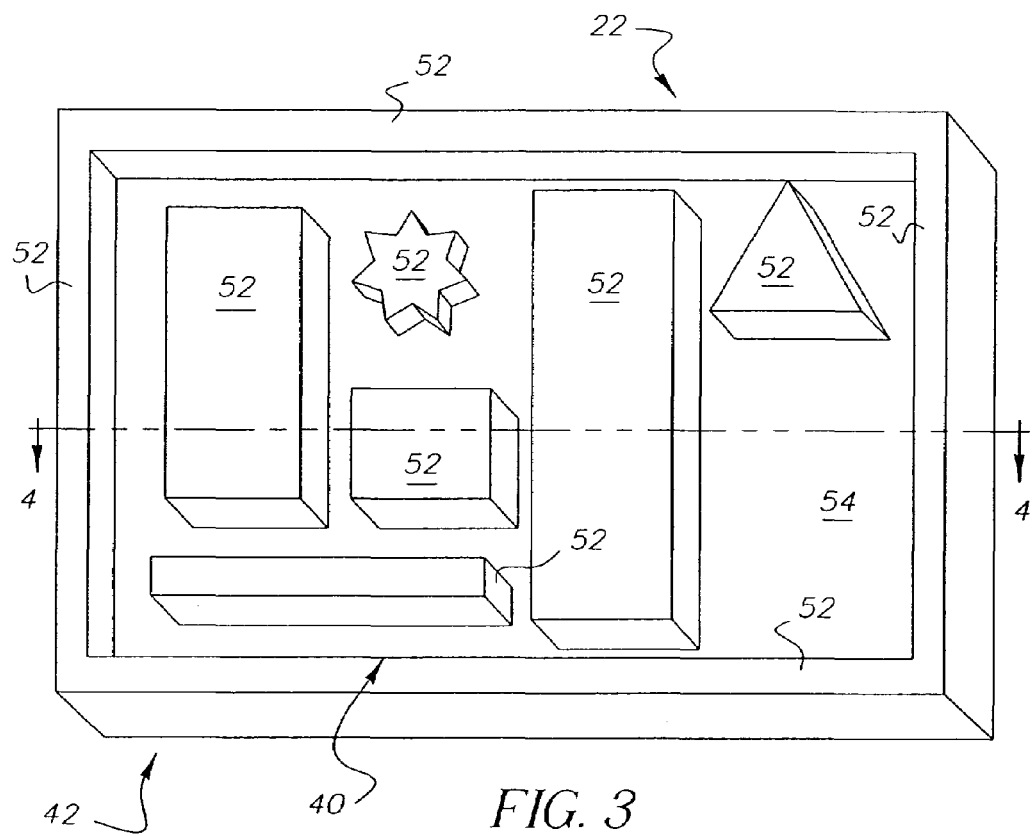
FIG. 3 shows an example of a substrate.
Figure 4:
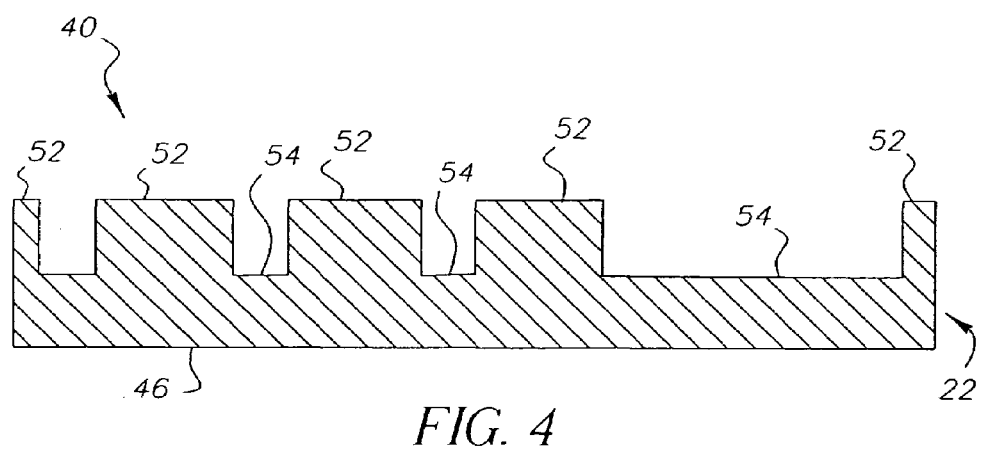
FIG. 4 shows a cross section view of the example substrate of FIG. 3.

FIGS. 3 and 4 show, respectively, a perspective and cross-section view of an example of substrate 22 formed in accordance with the embodiment of FIG. 1. FIG. 3 shows an example of channel pattern 40 formed on patterned surface 42 of substrate 22 by roller pattern 38. As can be seen in FIG. 3, channel pattern 40 can comprise various shapes, sizes and arrangements intended to facilitate particular electrical, magnetic, mechanical, optical or chemical structures as will be described in greater detail below. Raised areas 52 and channels 54 define each shape. FIG. 3 shows examples of only a few of the possible shapes that can be formed on a patterned surface 42 of substrate 22. Other shapes include ordered arrays of triangles, continuous fluidic channels, pyramids, squares, rounded features, curved features, cylinders, and complex shapes with multiple sides. In certain embodiments, the separation between raised areas 52 and channels 54 can range from 0.1 micrometers to about 100 micrometers, however, in other embodiments the sizes of the separation can range between 0.5 micrometers and 200 micrometers. It has experimentally been found that such extrusion roll molding processes provides precision negative replication of roller pattern 38. For example, it has been shown that where extrusion roll molding is used to form channel pattern 40 on patterned surface 42 of substrate 22, the features of channel pattern 40 typically replicate the dimensions of the features of roller pattern 38 at greater than 95% of the dimensional range. Such precision formation is possible even when forming substrate 22 operating at machine speeds in the 20 to 200 meter/min range. Accordingly, it is possible to reliably and economically form precise arrangements of raised areas 52 and channels 54 in substrate 22. This allows substrate 22 to be used to define a platform for fabricating and assembling a wide variety of useful structures.

Thermoplastic material 26 can comprise a variety of suitable materials. For example, polymers are generally low in cost, and can be efficiently formed into subsequent shapes utilizing known processes such as melt extrusion, vacuum forming and injection molding. Example polymers that can be used for thermoplastic material 26 include polyolefins, cyclo-olefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to can be used to obtain a thermoplastic material 26 having specific mechanical or optical properties. Polyamides that can be used in thermoplastic material 26 include, but are not limited to, nylon 6, nylon 66, and mixtures thereof. Copolymers of polyamides are also suitable continuous phase polymers that can be used in thermoplastic material 26. An example of a useful polycarbonate is bisphenol-A polycarbonate. Cellulosic esters are also suitable for use as thermoplastic material 26 and include cellulose nitrate, cellulose triacetate, cellulose diacetate, cellulose acetate propionate, cellulose acetate butyrate, and mixtures or copolymers thereof. Polyvinyl resins that can be used in thermoplastic material 26 include polyvinyl chloride, poly (vinyl acetal), and mixtures thereof. Copolymers of vinyl resins can also be utilized.

In addition, thermoplastic material 26 can comprise various known polyesters for the polymer features of the invention including those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include, but are not limited to, terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include, but are not limited to, ethylene glycol, propylene glycol, butanediol, pentanediol, hexanediol, 1,4-cyclohexanedimethanol, diethylene glycol, other polyethylene glycols and mixtures thereof.

Addenda is optionally added to thermoplastic material 26 to improve the optical, mechanical, chemical, magnetic or electrical characteristics of channel pattern 40 of raised area 52 and channel 54 formed in thermoplastic material 26. An example of such useful addenda that can be added include, but are not limited to, an optical brightener. An optical brightener is substantially colorless, fluorescent, organic compound that absorbs ultraviolet light and emits it as visible blue light. Examples include, but are not limited to, derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. Other useful addenda that can be added to thermoplastic material 26 include antistatic compounds, pigments, dyes, carbon black, polymer stabilizers or ultraviolet absorbers. Black thermoplastic can enhance the contrast of the waveguided image.

As is described above, substrate 22 has a patterned surface 42 with a channel pattern 40 formed by contact with roller pattern 38. As is shown in FIG. 4, substrate 22 also has a base surface 46 on a side of substrate 22 that is opposite from patterned surface 42. In certain embodiments, base surface 46 can be formed to receive image forming materials such as inks, dyes, toners, and colorants. This permits images to be formed, for example, on base surface 46 using ink jet printing, thermal printing, contact press printing and other techniques. There are various ways in which this can be done.

Where substrate 22 is formed using the extrusion roll molding apparatus 20 described in FIG. 1, base surface 46 is a surface that is a component of base 28. Accordingly, base 28 can be formed from a material that is adapted to receive image forming materials. Alternatively, base 28 can also be formed from a material that forms images when exposed to energy such as thermal, electrical, optical, electromagnetic or other forms of energy. Similarly, where substrate 22 is formed using the extrusion roll molding apparatus 2 described in FIG. 2, base surface 46 is formed from thermoplastic material 26. Accordingly, in such an embodiment, a thermoplastic material 26 can be used that is capable of receiving image forming materials or that is capable of forming an image when exposed to energy. In still another alternative embodiment, base surface 46 can be adapted by chemical or other treatments or coatings to receive image forming materials or to form images when exposed to energy.

In the embodiment shown in FIGS. 3 and 4, substrate 22 has a thickness between base surface 46 and channels 54 of approximately 100 microns. This provides rigidity and structure to substrate 22 that enables channel pattern 40 to maintain dimensional stability. However, in certain applications, channel pattern 40 can contain one or more channels 54 that are separated from base surface 46 to a different degree and can form a passage through substrate 22 and define an opening at base surface 46.

Channel pattern 40 formed on substrate 22 can also optionally be coated with coatings that improve the optical, physical, electrical or chemical characteristics of raised areas 52 and channels 54. Examples of such coatings include urethane for scratch resistance, hard coats, antiglare coatings, antireflection coatings, antistatic materials and dyes for changing the color of the polymer features. Coating methods that can be used to apply such coatings include, but are not limited to, roll coating, slit die coating, gravure coating, curtain coating, and ink jet coating. Such coatings can be applied in a uniform, random or controlled pattern. Coatings can also form cladding, typically a layer with a relatively low index of refraction.

Using Substrate to Form an Optical Converter

Figure 5:
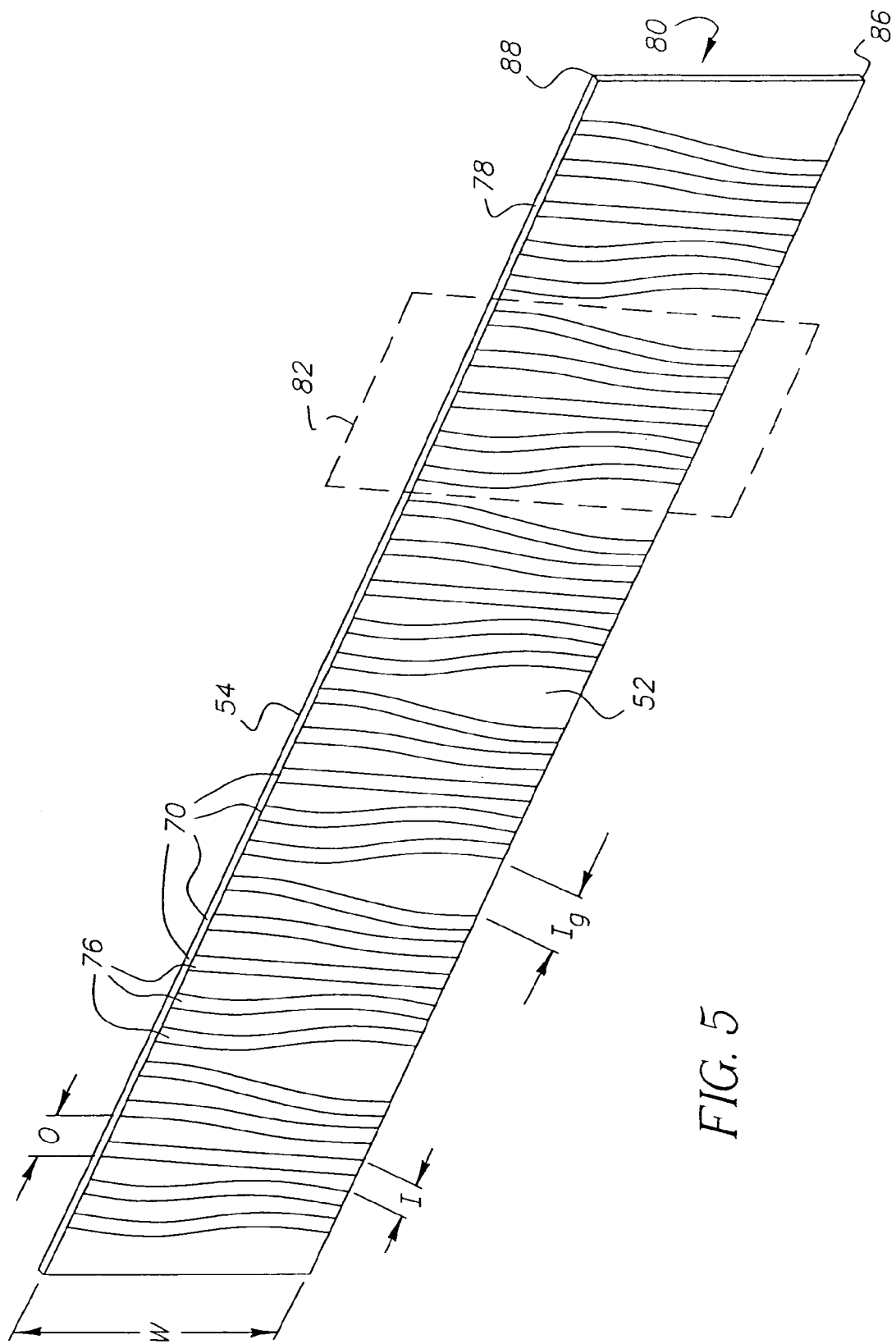
FIG. 5 shows a perspective view of a light guide ribbon structure of the present invention.

Referring to FIG. 5, there is shown a representative light guide ribbon structure 80 which serves as an elemental component for optical converter fabrication. Formed using substrate 22, light guide ribbon structure 80 comprises a plurality of light guides 70, generally disposed in parallel to each other. Light guides 70 extend from an input edge 86, over width W, to an output edge 88. Adjacent light guides 70 on input edge 86 are spaced apart by an input edge guide-to-guide distance I. Depending on how light guides 70 are clustered, a group of light guides 82, as indicated by a dotted box in FIG. 5, can be further separated at input edge 86 by an input edge guide-to-guide group distance $I_g$. Adjacent light guides 70 on output edge 88 are spaced apart by an output edge guide-to-guide distance O. To form an optical converter having useful optical qualities, it is important to be able to precisely arrange and geometrically define light guides 70.

Using any embodiment of extrusion roll molding apparatus 20, it is possible to create a web 74 of substrate 22 with a plurality of channel patterns 40 thereon having precise arrangements of raised areas 52 and channels 54. The precise arrangement of raised areas 52 and channels 54 can be used to form precise arrangements of light guides 70. One example of such a substrate 22 is the web 74 of substrate 22 shown in FIG. 6. As can be seen from FIG. 6, channels 54 formed in substrate 22 effectively serve as molds that can receive the subsequent application of an optical material (not shown) to form each light guide 70. The optical material can be applied in any of a variety of manners to fill the channels 54. After filling and curing in channels 54 light guides 70 are formed in channels 54. After formation of each light guide 70, in the channels 54 of substrate 22, the web of substrate 22 and light guides 70 formed in the channels 54 thereon can be divided, for example, by slitting the web of substrate 22 and light guides formed thereon along dotted input edge cut lines $C_i$ and output edge cut lines $C_o$ shown in FIG. 6, to provide a plurality of separate light guide ribbon structures 80a, 80b, 80c, 80d and 80e.

Figure 6:
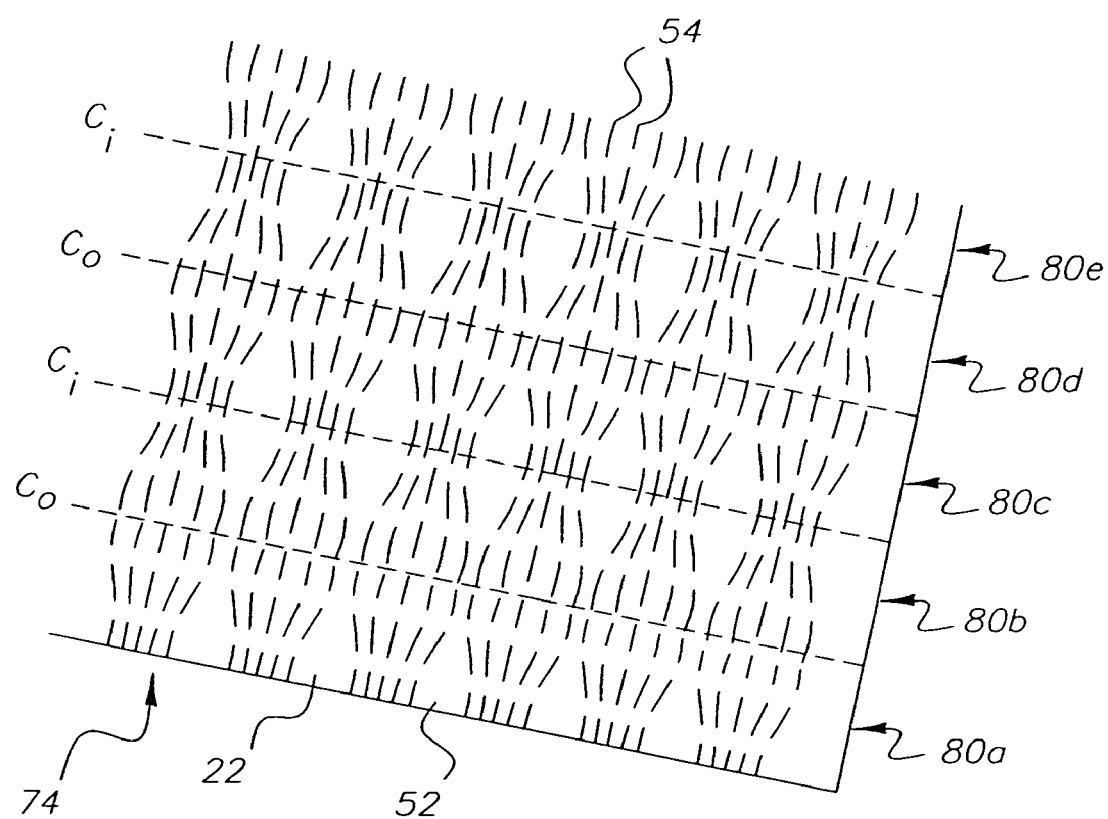
FIG. 6 is a perspective view showing a substrate fabricated with channels for multiple light guide ribbon structures.
Figure 7:
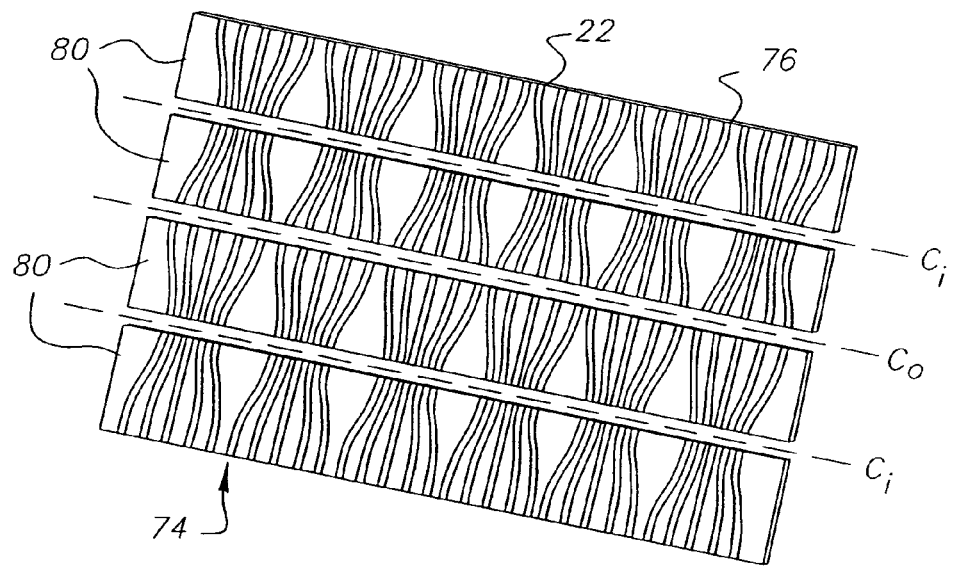
FIG. 7 is a perspective view showing a substrate fabricated with channels for multiple light guide ribbon structures.

The use of injection roll molding allows a number of alternative channel patterns 40 to be fabricated in substrate 22. Thus, while FIG. 6 shows channels 54 formed generally parallel to the edges of the sheet of substrate 22, (that is, in a direction parallel to the direction of substrate 22 through extrusion roll molding apparatus 20), other arrangements are possible. For example, channels 54 can be formed in a direction orthogonal to the edges of substrate 22, as is shown in FIG. 7, or at some other angle relative to the edges. Further, the use of extrusion roll molding methods to form substrate 22 permits the formation of a web 74 of substrate 22 having a length that can be on the order of several meters or more, and which could extend a thousand meters or more. This permits economical bulk fabrication of, for example, light guide ribbon structures 80 using such a web 74 of substrate 22.

Figure 8:
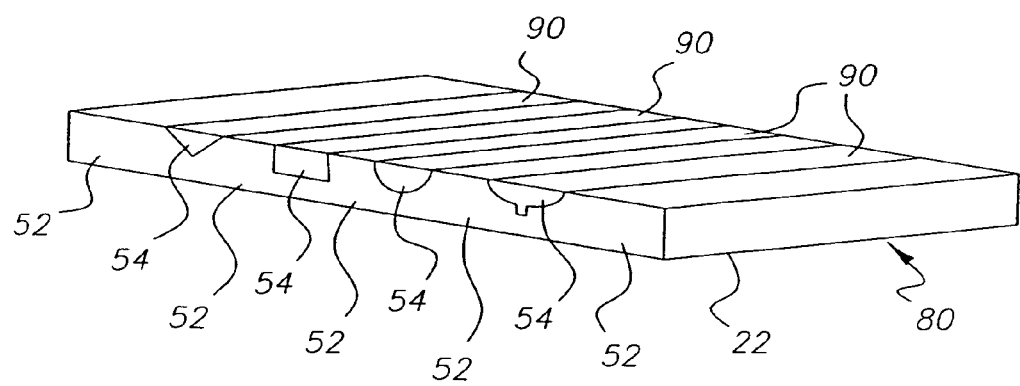
FIG. 8 is a perspective view showing individual light guide ribbon structures separated from each other by being severed from the substrate of FIG. 6.
Figure 9:
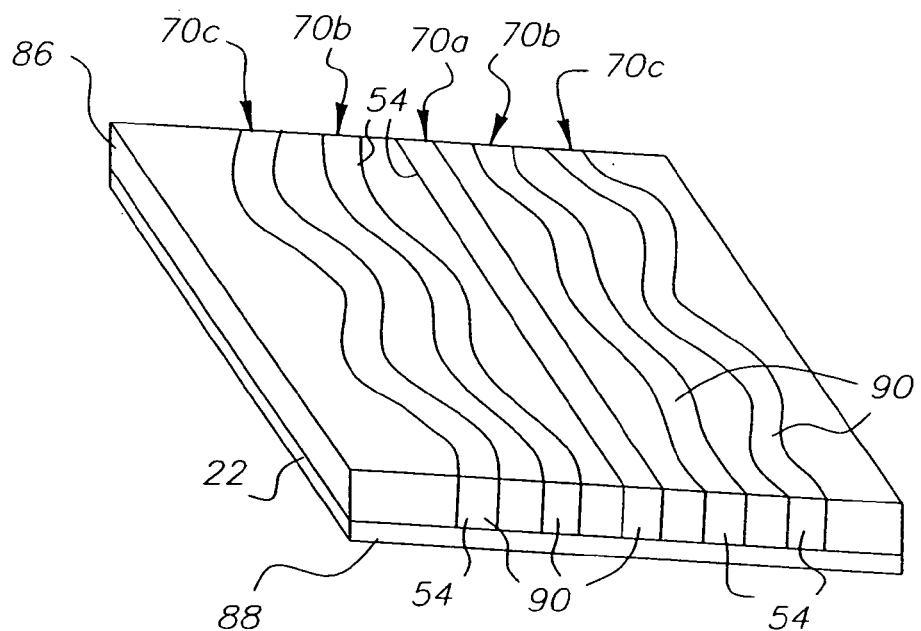
FIG. 9 is a perspective view showing an arrangement of channels formed within a light guide ribbon structure according to the present invention.

As is shown in FIG. 8, raised areas 52 and channels 54 can have a range of possible cross-sectional shapes, as determined by roller pattern 38 on pattern roller 36 with these cross sectional shapes adapted to receive a curable optical material 90 and to mold curable optical material 90 to form light guides 70$a$, 70$b$ and 70$c$ having shapes that conform to shapes of channels 54. Further, as is shown in FIG. 9, the path taken by individual ones of light guides 70$a$, 70$b$, and 70$c$ from an input edge 86 of light guide ribbon structure 80 to an output edge 88 can vary. For example, direct light guides 70$a$ can be provided that move light across a direct path between a input edge 86 and output edge 88, indirect light guides 70$b$ can be provided that move light across a less direct path, and circuitous light guides 70$c$ can also be provided that move light along a more circuitous route.

Figure 10:
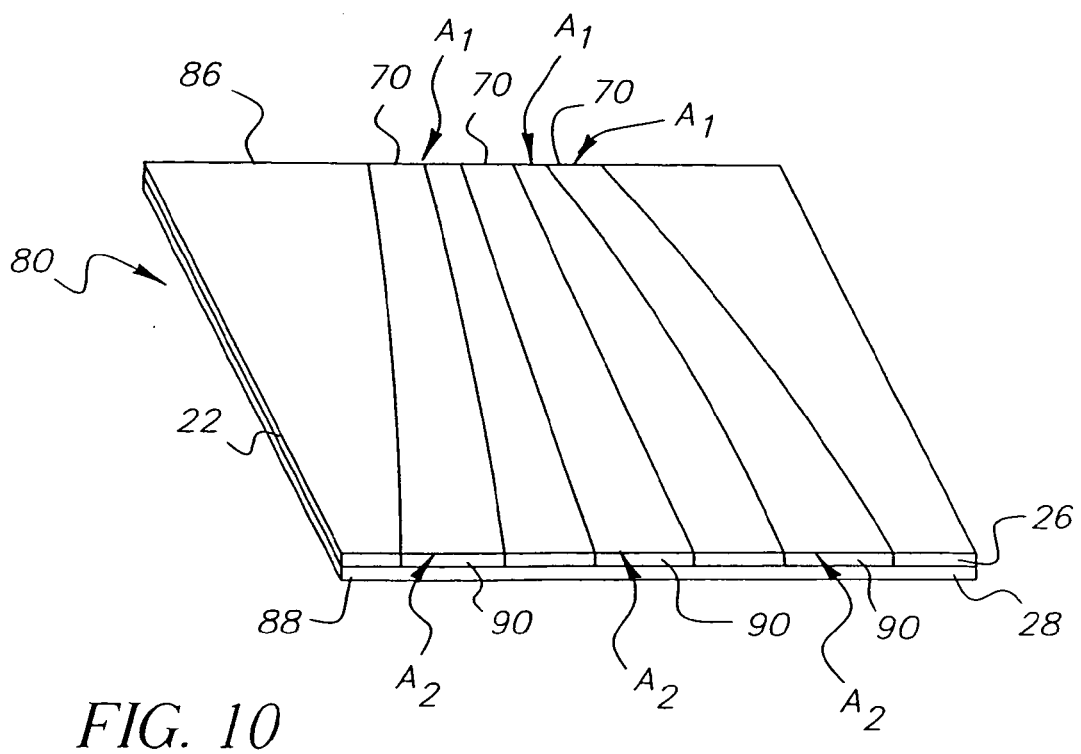
FIG. 10 is a perspective view of a light guide ribbon structure.

In addition, fabrication using any embodiment of the extrusion roll molding apparatus 20 allows the dimensions of channels 54 to be controlled at different locations along light guide 70, thus allowing light guide 70 to have different cross-sectional areas and/or shapes along its length. For example, as is shown in FIG. 10, a light guide ribbon structure 80 has light guides 70 each having an exit area $A_2$ near output edge 88 that is larger than an entrance area $A_1$ of light guides 70 at the input edge 86. This can be used for example, in conjunction with one or more picture elements of a video display to improve the effective pixel fill factor or to adjust the brightness of the display. This capability could also be used, for example, for forming the equivalent of a tapered optical fiber faceplate, such as fiber optic tapers available from Edmund Industrial Optics, Barrington, N.J. In a tapered optical fiber faceplate, each composite optical fiber is wider at one end than at the other.

Application of Optical Material for Forming Light Guides

As noted above, light guides 70 are formed using substrate 22 by applying an optical material 90 to fill or partially fill channels 54 in substrate 22. Optical material 90 is typically some type of transmissive material having favorable optical qualities for light transmission and refraction. For example, optical material 90 could be a polymer of the type that can be cured as a result of exposure to ultra-violet light, such as Norland Optical Adhesive from Norland Products, Cranbury, N.J. Alternate types of optical material 90 can be utilized, depending on speed, temperature, thickness, flexibility and other requirements.

Substrate 22 surrounds the optical material 90 and has an index of refraction that is less than the index of refraction of the substrate 22. Such an arrangement typically results in substantial internal reflection of light traveling through the optical material 90. The internal reflection of light occurs when light traveling down the optical is reflected back towards the center of the optical material as the light encounters the inner surface of the substrate 22. The efficiency of the optical waveguide decreases if the substrate 22 is smaller in index of refraction than the optical material 90 by less than 0.05. The substrate 22 could have, in another embodiment, a layer of cladding between the substrate and the optical material. This allows more freedom in the polymer or material chosen for the substrate because the cladding has the property of having an index of refraction lower than the optical material and produces the waveguiding effect. In some embodiments, cladding (not shown) can be co-extruded with, coated on, or deposited on substrate 22 adjacent to the light guides to help influence the index of refraction. The cladding can also be a reflective layer. Having a reflective layer (such as metal) surrounding the optical material acts like a mirror and keeps most of the light in the optical material making a very efficient waveguide.

A variety of materials can be used to form optical material 90 and cladding. Optical material 90 is typically formed from a polymeric material, including, for example methacrylates, such as n-butyl methacrylate and 2-ethylhexyl methacrylate. In particular, one suitable optical material includes a 1:1 mixture by weight of n-butyl methacrylate and 2-ethylhexyl methacrylate, which, in turn, can contain 0.05% by weight triethylene glycol dimethacrylate crosslinking agent and 0.2% by weight di(4-t-butylcyclohexyl)peroxydicarbonate (Perkadox 16.TM., Akzo Nobel Chemicals, Inc., Chicago, Ill.) thermal initiator. Additional materials and examples are presented in U.S. Pat. No. 5,225,166, incorporated herein by reference.

Cladding can be formed from a variety of different compounds. Polymers are preferred as they are cheap and easily processable. As an example, fluoropolymers have been found to be useful as a cladding for the light guiding layer because of their relatively low index of refraction. The larger the difference in index of refraction (with the optical material having a higher index of refraction than the cladding) the more efficient the light guide is and less light is lost.

Figure 11:
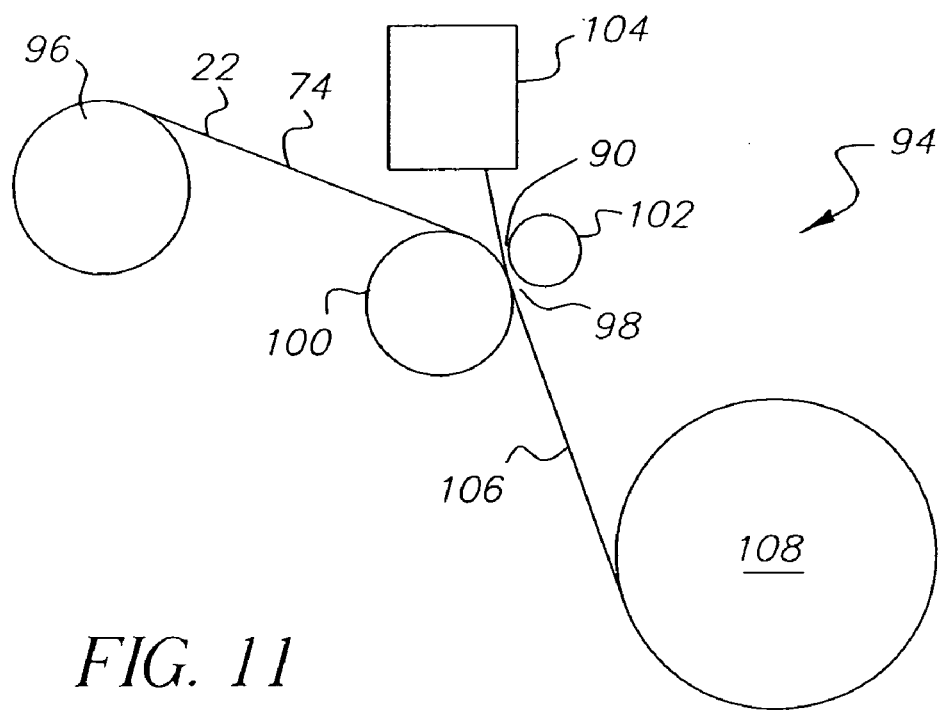
FIG. 11 is a schematic block diagram showing a manufacturing process used to fill channels with an optical material for forming light guides.

The specific type of optical material 90 then determines the necessary curing time and needed cure conditions, such as heat or light energy. Optical material 90 is typically applied in an amorphous or other state that allows optical material to flow into channels 54 and is curable so that after optical material 90 has filled channels 54, optical material 90 can transition into a state that allows optical material 90 to solidify enough to remain within channels 54 and to provide an efficient and useful optical pathway. In one embodiment, as shown in FIG. 11, optical material 90 is introduced into channels 54 on substrate 22 using roller pressure. FIG. 11 shows, in schematic form, a coating apparatus 94 for forming light guides 70 using web 74 of substrate 22. Web substrate 22 is formed as described above or using some other method, is fed from a source, such as a roll 96. Alternately, the source can comprise an extrusion roll molding apparatus 20 used to supply web 74 of substrate 22 directly to coating apparatus 94 without intermediate storage of web 74 of substrate 22 on roll 96.

In the embodiment shown in FIG. 11, web 74 of substrate 22 is pulled through a gap 98 between rollers 100 and 102. A source 104 provides a supply of optical material 90 that flows into gap 98. Rollers 100 and 102 apply pressure that forces optical material 90 into channels 54 to form web 106 of light guide ribbon structures with light guides 70 in appropriate channels 54. Web 106 is then wrapped onto a receiver 108 or stored in some other way. Alternately, web 106 can be further processed in-line, optionally coated or otherwise treated, then cut, folded or otherwise processed to provide individual light guide ribbon structures 80, ready for use in forming an optical converter.

Figure 12:
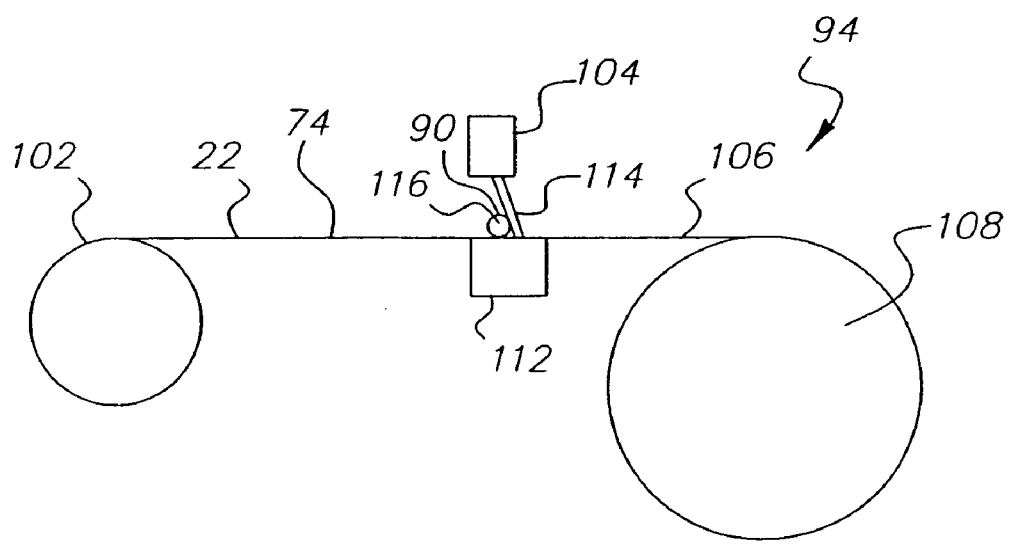
FIG. 12 is a schematic block diagram showing an alternate manufacturing process used to fill channels with an optical material for forming light guides.

Referring to FIG. 12, there is shown another embodiment of a coating apparatus 94 that uses a slightly different technique for filling channels 54 in substrate 22. Here, web 74 of substrate 22 is passed between coating support 112 and a skiving mechanism 114 that is continuously supplied by source of optical material 90 with a meniscus 116 of optical material 90. This forces optical material 90 into channels 54, forming light guides 70 within channels 54 as web 106 is fed forward and onto receiver roll 108.

Any of a number of other coating techniques known in the art can be used to apply optical material 90 to fill or partially fill channels 54 in substrate 22. Specific examples of such other methods include: roll coating and doctor blade coating, gap coating, curtain coating, slot die coating, spraying or printing or using and other coating techniques, some of which are described in greater detail below. Certain of these coating methods are described in greater detail in commonly assigned U.S. patent application Ser. No. 10/411,624 filed Apr. 11, 2003, in the name of Kerr et al.

Various types of additional coatings can optionally be provided for during light guide ribbon structure 80 fabrication, either before or after filling channels 54 with optical material 90. For example, optical coatings could be applied for optimizing reflective response, for improved light absorption, to provide a different index of refraction, or for reducing stray light effects. Other types of coatings could be applied, including protective or adhesive coatings, for example, or coatings that provide spacing distances or suitable mounting surfaces. Coatings could be applied to either or both sides of substrate 22, or to any portion thereof, including channels 54 or surrounding structures. For example, a coating could be applied only within one or more channels 54, to provide channels 54 having specific optical properties. Coatings for spacing could be applied at appropriate thicknesses for obtaining the needed distance between adjacent rows of light guides 70 at input and output edges 86 and 88. It would be possible, for example, to vary the coating thickness appropriately between input and output edges 86 and 88 in order to obtain the necessary dimensions. In one embodiment, an output-to-input thickness ratio for an applied coating exceeds about 1.4, for example.

Assembly and Alignment

Figure 13:
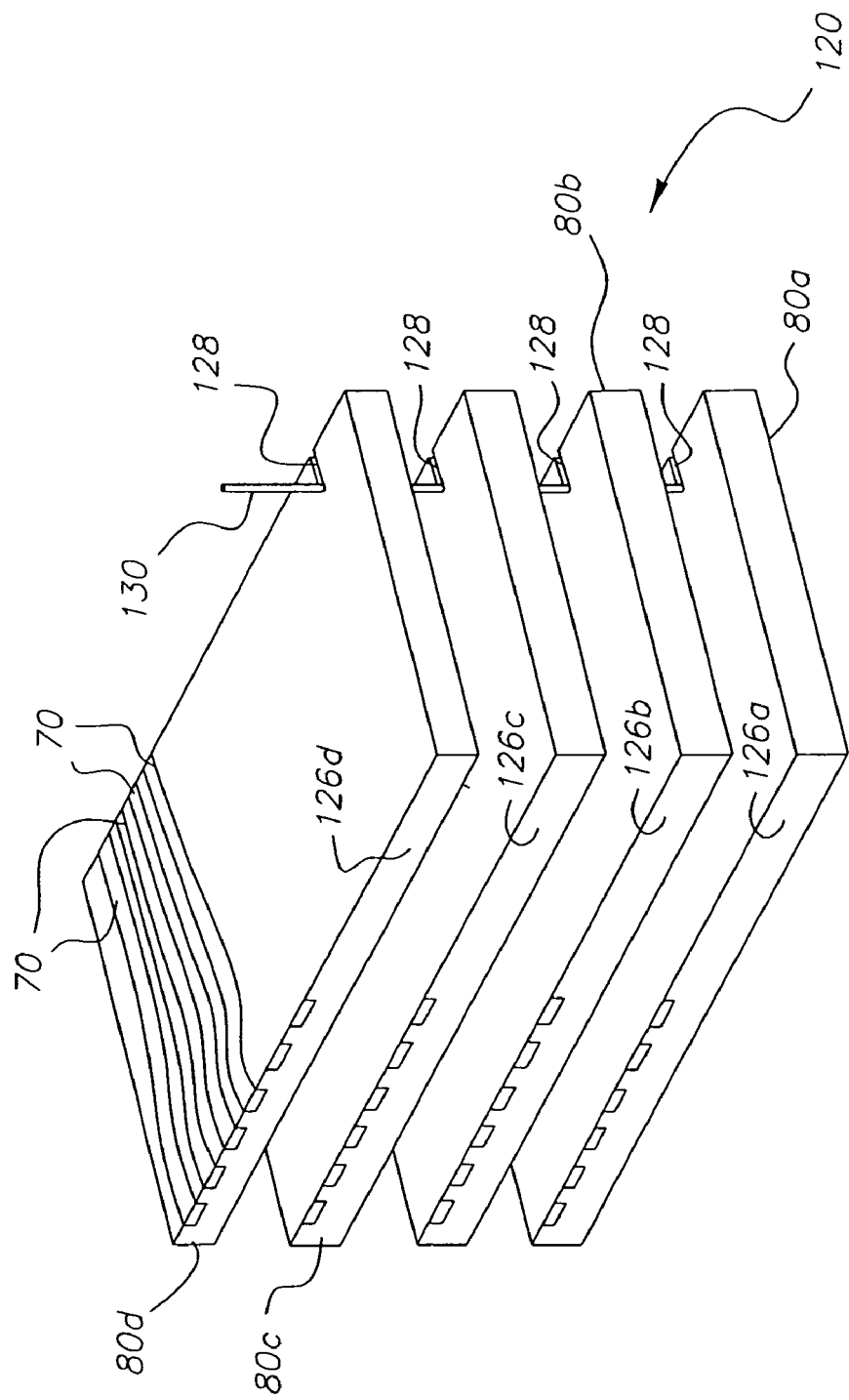
FIG. 13 is a perspective, exploded view showing a stacking of individual light guide ribbon structures.
Figure 14:
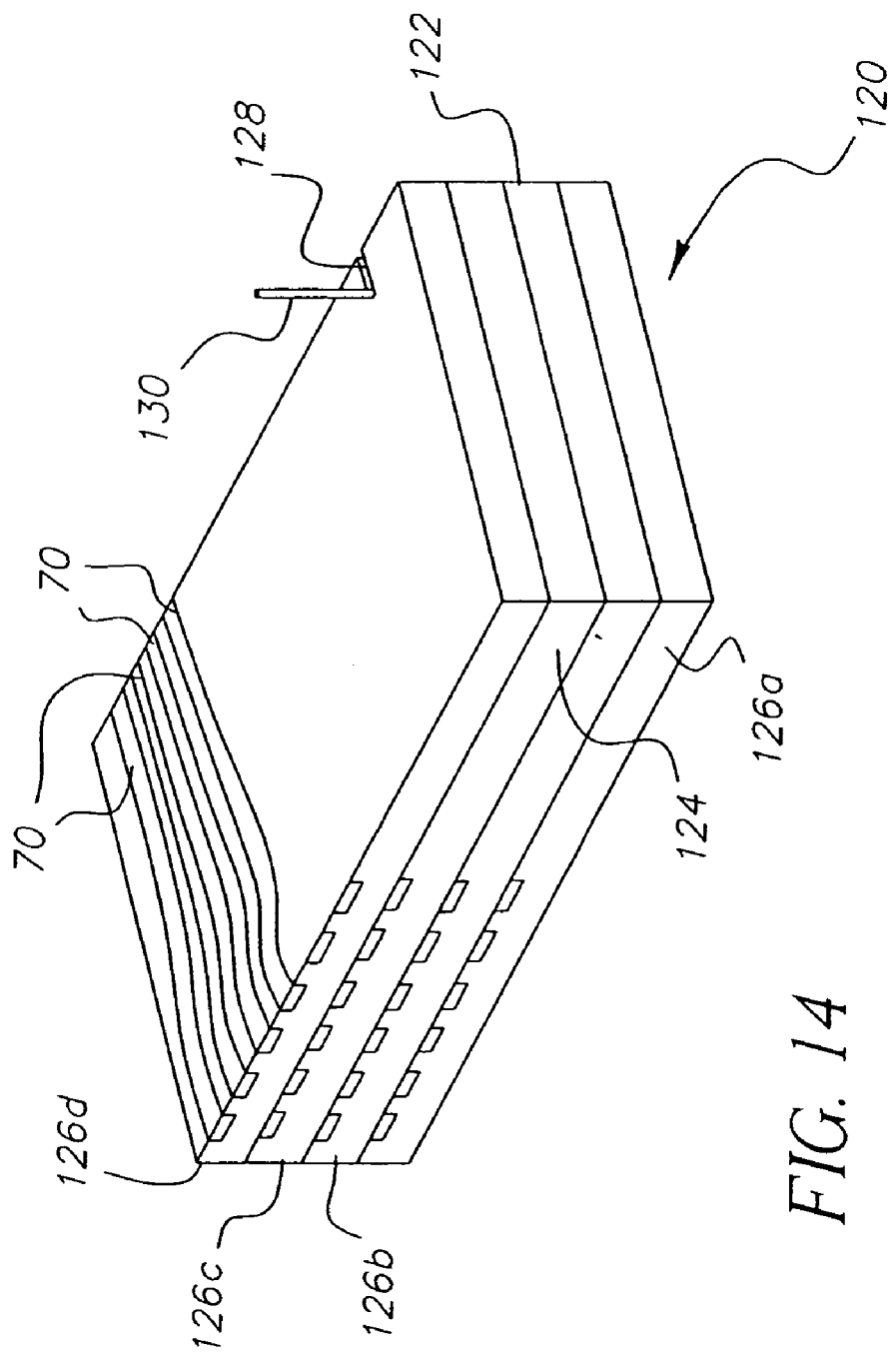
FIG. 14 is a perspective view of a portion of an assembled optical converter using stacked light guide ribbon structures.

Referring to FIGS. 13 and 14, there are shown exploded and assembled views, respectively, that illustrate how light guide ribbon structures 80a, 80b, 80c and 80d can be stacked together in order to form an optical converter 120 having an input edge 122 and an output edge 124. In another alternative, light guide ribbon structures 80a, 80b, 80c and 80d can have predefined mounting and/or alignment passages 128 that allow mechanical locating structures such as an alignment pin 130 to be inserted into alignment passages 128. Such alignment passages can be formed as a part of the pattern of channels 40 formed on substrate 22. Other conventional mechanical alignment mechanisms can be used. Other mechanisms for obtaining alignment between light guide ribbon structures 80 could include for example, holes, detents, sockets, pins, and the like, for example. Magnets and ferrous materials could alternately be employed, as part of substrate 22, for example, for obtaining and maintaining alignment.

Alternatively, light guide ribbon structures 80a, 80b, 80c and 80d have output edges 126a, 126b, 126c, and 126d respectively that are used for aligning the light guide ribbon structures 80a, 80b, 80c and 80d. For example, the alignment of output edges 126 can be accomplished using an external jig or form (not shown) to engage output edges 126 to ensure proper alignment.

Electromechanical systems can also be used. For example, machine vision or other like sensing systems can be used to determine alignment of a plurality of light guide ribbon structures, electronically, based upon the appearance of the arrangement of light guide ribbon structures and to mechanically adjust the same based upon the sensed information Light guide ribbon structures 80a, 80b, 80c and 80d can be affixed to each other using an adhesive, for example. An adhesive could be coated onto light guide ribbon structure 80 during fabrication, allowing "peel-and-stick" adhesion of ribbon structures 80 to each other or to some other surface. Optionally, an adhesive could be applied during assembly of optical converter 120. Fillers and spacer elements could also be provided. Alternate ways for joining light guide ribbon structures 80a, 80b, 80c and 80d include using mechanical fasteners, thermal stoking, welding, compression fitting and/or forming interlocking features on each of light guide ribbon structures 80a, 80b, 80c and 80d that are adapted to engage like features on adjacent light guide ribbon structuring. Any other known mechanical system can be used to join light guide ribbon structures 80a, 80b, 80c and 80d in an aligned fashion.

In FIGS. 13 and 14, light guide ribbon structures are shown as being aligned by being stack in a predefined linear stacking pattern. However, other stacking patterns can be used.

Figure 15A:
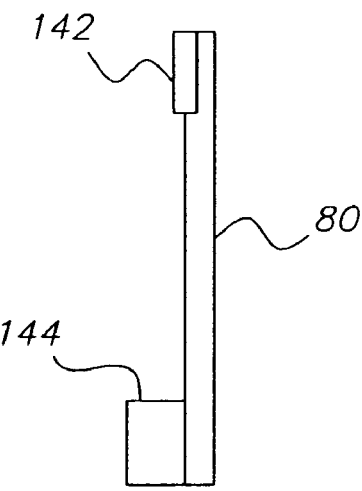
FIGS. 15a, 15b, 15c, and 15d show, in a sequence, the fabrication of an optical converter using stacked light guide ribbon structures with the addition of optional spacers.
Figure 15B:
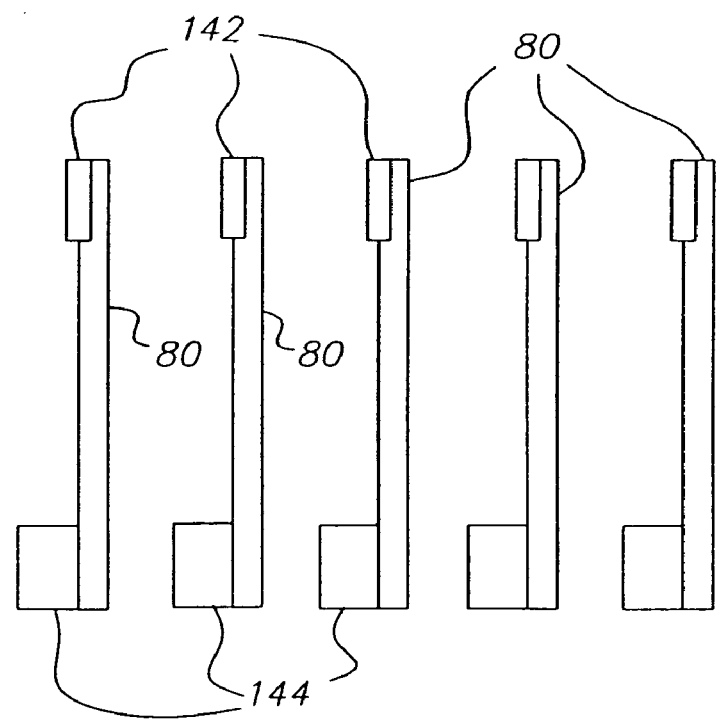
Figure 15C:
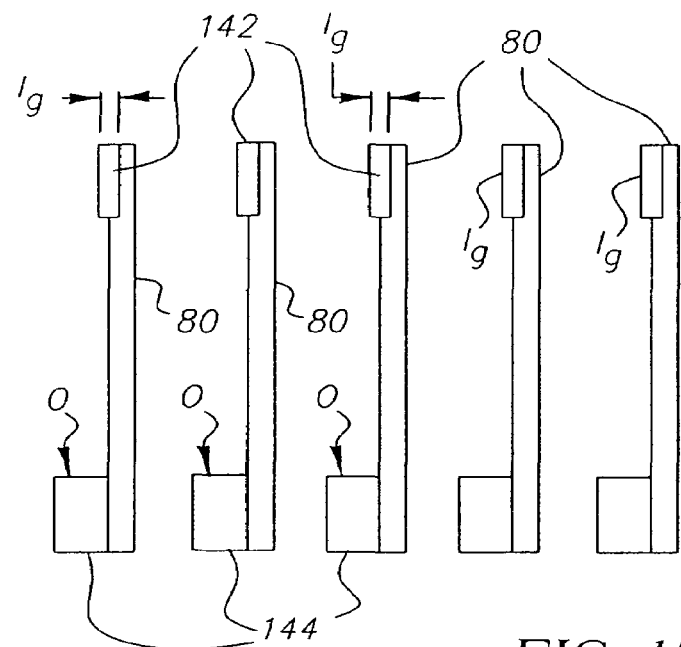
Figure 15D:
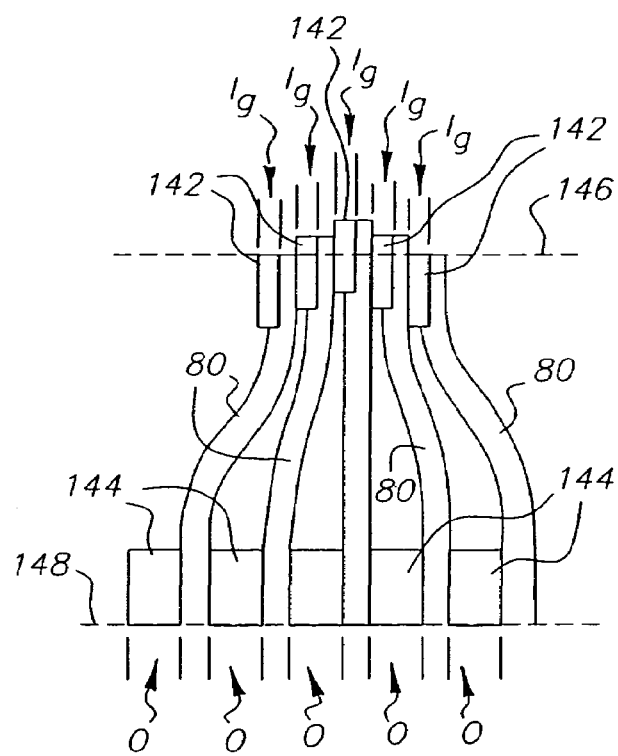

FIGS. 15a through 15d show side views of one embodiment depicting successive light guide ribbon structures 80 can be stacked against each other to form an optical converter 120. FIG. 15a shows a single light guide ribbon structure 80, having added input and output edge spacers 142 and 144 respectively. FIG. 15b shows multiple light guide ribbon structures 80 lined up symmetrically, with input edge spacer 142 and output edge spacer 144 having the proper orientation for stacking. FIG. 15c shows how output edge 148 is assembled, with output edge spacers 144 disposed between light guide ribbon structures 80. FIG. 15d shows how input edge 146, represented by a dotted line, is then formed. As suggested in FIG. 15d, some trimming at input edge 146 may be required for maintaining flatness at input edge 146. Of course, light guide ribbon structures 80 can be fabricated to have different widths (W in FIG. 1), thereby obviating the need for trimming as suggested in FIG. 15d.

Where used, input edge spacer 142 maintains the fixed input edge guide-to-guide distance $I_g$ and also determines an input edge distance between light guide ribbon structures 80 when stacked, as is described subsequently. As is noted above, a collection of light guides may form group of light guides 70; with such an arrangement, there would be an input edge guide-to-guide group distance $I_g$ between groups of light guides 70 at input edge 146. Similarly, light guide ribbon structures 80 on output edge 148 have an output edge guide-to-guide distance O. Output edge spacer 144 maintains the fixed output edge guide-to-guide distance O and also determines an output edge distance between successive light guide ribbon structures 80 when stacked against each other, as is described subsequently.

Input edge spacer 142 and output edge spacer 144 could be fabricated from a number of different materials and could be tape, plastic, adhesive, or molded, for example. Alternately, light guide ribbon structure 80 itself could be fabricated to be thicker or thinner at either input edge 146 or output edge 148, thereby providing the proper dimensional relationship when stacking. Or, coatings could be employed to achieve separation at suitable spacings for input edge 146 and output edge 148. For example, a coating having a variable thickness can be used such as a coating that is thicker along output edge 148 than along input edge 146. Where such coatings are used to obtain separation at input edge 146 and output edge 148, the ratio of coating thickness along output edge 48 to coating thickness along input edge 146 can be, for example, in excess of about 1.4.

Figure 16:
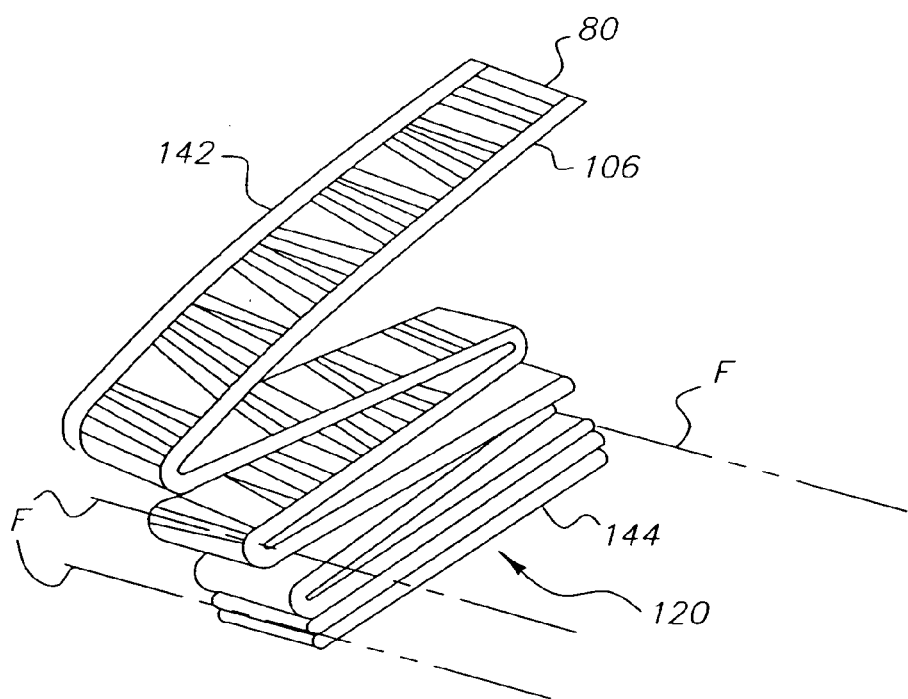
FIG. 16 is a perspective view of a light guide ribbon structure folded against itself to form an optical converter according to one embodiment of the present invention.
Figure 17:
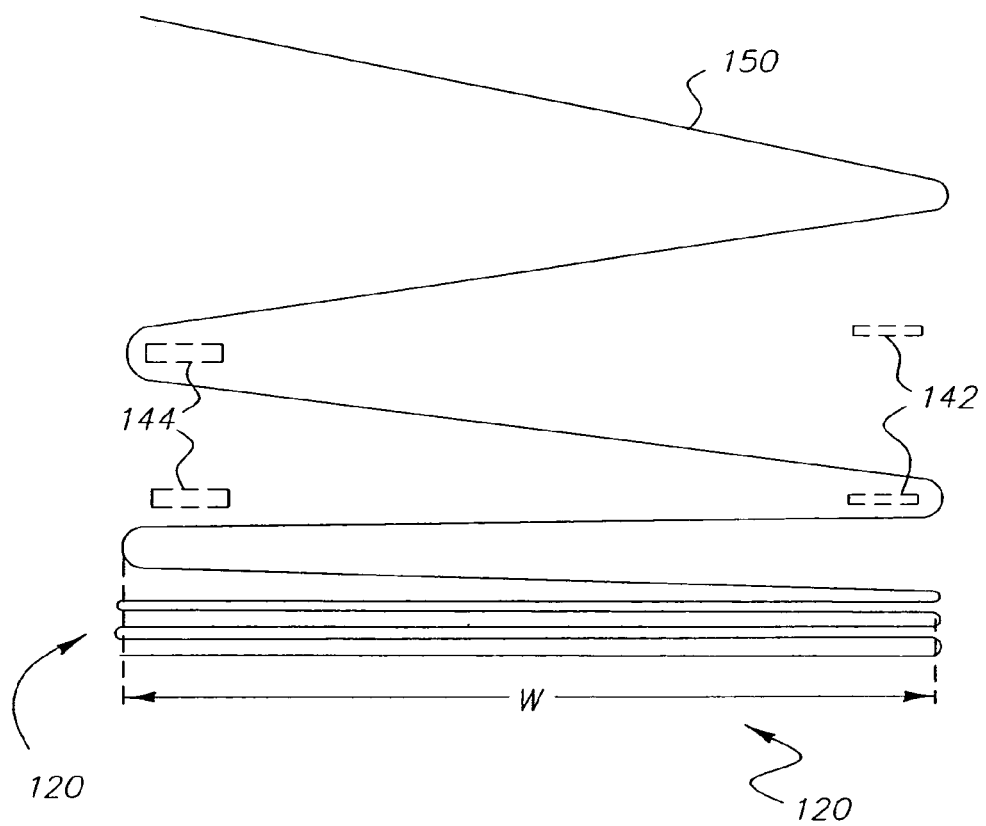
FIG. 17 is a side view showing an alternate method for accordion-folding a sheet of light guide ribbon structures for forming an optical converter.

Referring to the perspective view of FIG. 16, there is illustrated an alternate embodiment of a method for assembling optical converter 120. In this embodiment a web 106 of light guide ribbon structures 80 is folded back against itself one or more times on fold lines F. Referring to FIG. 17, there is illustrated yet another embodiment of a method for assembling optical converter 120 from slits 150 of ribbon structures 80. In this embodiment, slits 150 is accordion-folded at positions corresponding to the input edge cut lines $C_i$ and output edge cut lines $C_o$ shown in FIG. 6. Optional input and output edge spacers 142 and 144 can be inserted into the accordion-folded stack 152, as indicated in FIG. 17. The folding arrangements of FIGS. 16 and 17 allow similar alignment mechanisms as are noted above for use with individual stacked light guide ribbon structure 80 segments.

Shaping Optical Converter 120

The use of light guide ribbon structures 80 allows considerable flexibility for adapting the dimensions and curvature of optical converter 120. By changing the length of light guide ribbon structure 80 segments, various arrangements of height and width for optical converter 120 can be obtained. Light guide ribbon structures 80 can be wrapped together in a number of different ways to adapt the shape of optical converter 120, for example. As is noted above, light guide ribbon structures 80 themselves could be fabricated with curved shapes, allowing a variety of shaped arrangements for optical converter 120.

Figure 19:
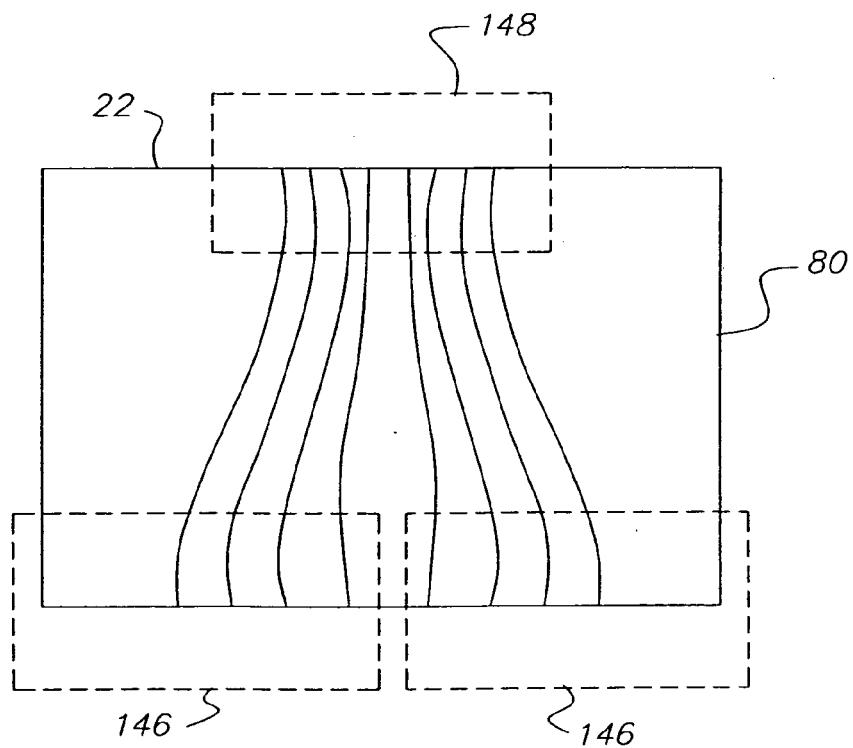
FIG. 19 shows an alternate embodiment in which a light guide ribbon structure has more than one input edge, routing light guides to an output edge.
Figure 18:
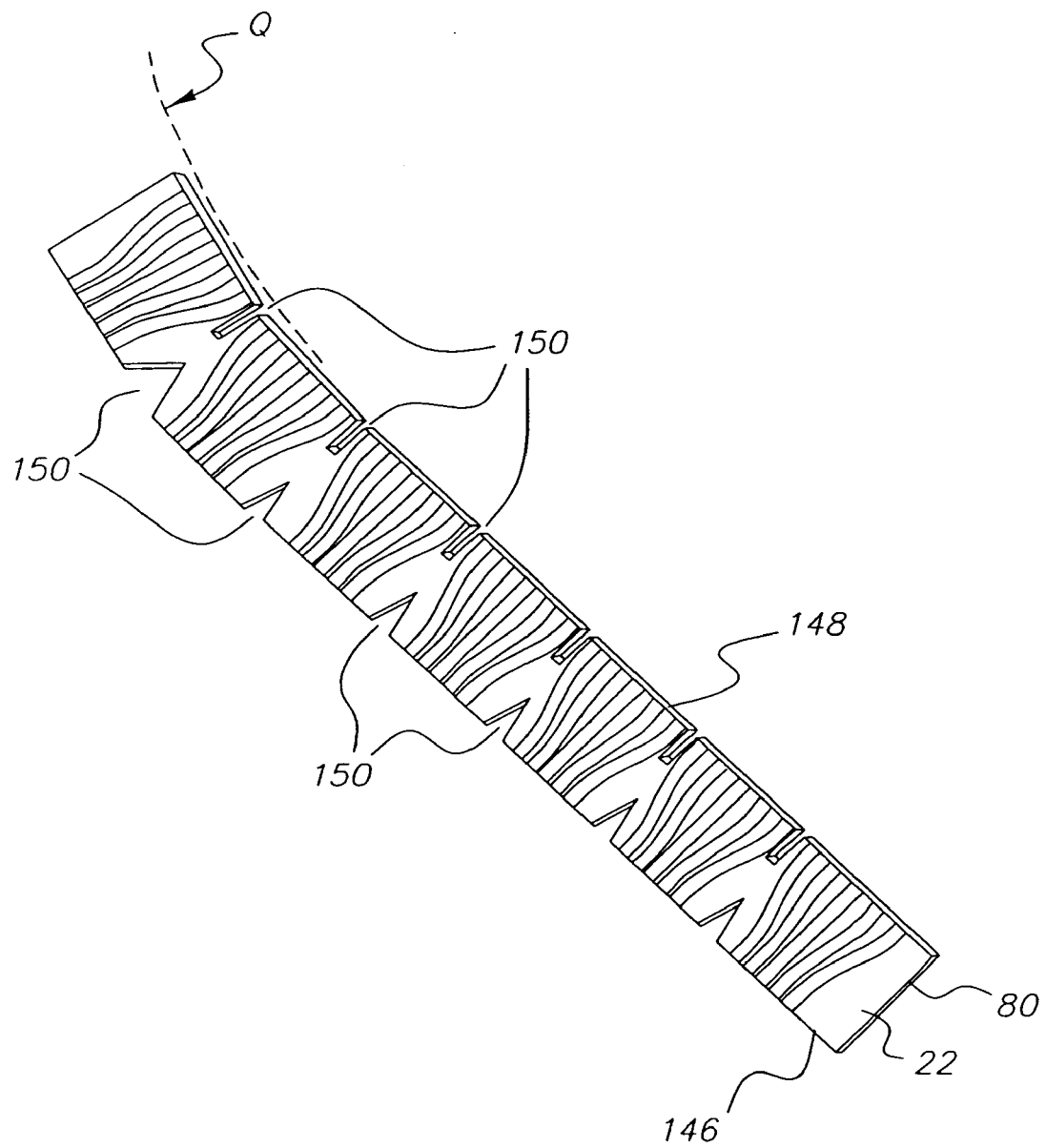
FIG. 18 is a perspective view showing how a light guide ribbon structure can be adapted to provide a curved surface.

Slight adaptations at input and output edges 146 and 148 can allow light guide ribbon structures 80 to be combined to provide a curvature to an input edge 122 or an output edge 124 of optical converter 120. Referring to FIG. 18, light guide ribbon structure 80 is adapted for a slight curvature Q with a number of slits 150 in input edge 146 and output edge 148 to yield curvature Q as shown. Curvature Q could be in either a convex or concave direction. Curvature Q could be provided as ribbon structure 80 is formed on substrate 22 or could be provided by subsequent processes, such as providing slits 150 as shown in FIG. 18. A variety of additional shapes and arrangements can be obtained, including arrangements having a different number of input edges 146 and output edges 148. FIG. 19 shows a simple example in which a light guide ribbon structure 80 has more than one input edge 146, routing light guides 70 to output edge 148. Using a combination of curvature, various arrangements of input and output edges 146 and 148, and tiling, large display structures could be assembled from optical converters 120 fabricated according to the present invention.

Finishing Operations

Once light guide ribbon structures 80 are appropriately aligned so as to form input face 122 and output face 124, finishing operations can be performed. These processes provide final shaping, encasing materials, and surface finishing operations, and may also employ methods for improving the optical performance of assembled optical converter 120.

Heat or abrasive substances may be employed for shaping the ends of light guides 70. For example, heat may be applied to shape the end of each light guide 70, forming an integral lens structure for each channel 54 thereby.

Any number of types of interstitial substances can be used for filling spaces between light guide ribbon structures 80. Interstitial materials may comprise plastics, resins, epoxies, or other suitable materials, including materials selected for specific optical properties, such as for light guiding. Black interstitial material, or interstitial material having a specific optical index could be employed to preventing unwanted effects, such as cross-talk between light guide ribbon structures 80. Optical converter 120 can be finished by immersion into a hardening liquid of some type.

It must be noted that interstitial substances would be optional, since there may be uses for which a flexible optical converter 120 arrangement is most advantageous. For example, there may be applications in which dithering or other mechanical movement or flexibility is useful.

Methods for Obtaining Alignment of Pixels

One key problem in optical converter fabrication relates to fiber alignment to individual light sources in an array or "pixel-to-pixel" alignment. This problem has not been satisfactorily solved for high-density imaging applications using the conventional fabrication methods described in the background material above. Instead, some type of workaround has been used, such as generally grouping multiple optical fibers for a single light source so that at least some of the fibers receive the intended light. However, such a solution does not provide pixel-to-pixel alignment and clearly constrains the resolution of optical converter 120.

Using the method of the present invention allows for the formation of an optical converter 120 having a precise arrangement of light guides 70. In particular, the arrangement of light guides 70 within each light guide ribbon structure 80 can be precisely defined and shaped within each light guide ribbon structure 80. Further, using the method of the present invention, the relative arrangement of light guides 70 in one light guide ribbon structure 80 can be precisely positioned relative to the arrangement of light guides 70 in an adjacent light guide ribbon structure 80. The degree of optical conversion can be precisely defined in a bi-axial manner with the degree of conversion provided across the light guides 70 of individual light guide ribbon structures being different from the degree of conversion provided between light guide ribbon structures 80 of the optical converter 120.

It is instructive to note that the terms "input" and "output" as used in this specification are relative terms and could be reversed. The sense in which these terms are used herein relates to use of optical converter 120 as part of a display, including a tiled display, for example. Optical converter 120 could alternately be used as part of a light-gathering instrument, in which case the input side would typically require larger guide-to-guide spacing I to direct light to a small sensing component on output face 124. The method of the present invention allows fabrication of fiber optic faceplates 100 used in either orientation, with variable spacing at opposite faces or with equal spacing if needed.

Alternate Embodiments

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, optical converter 120 components manufactured using the methods and apparatus of the present invention could be any of a range of sizes. Various methods could be applied for finishing, packaging, and tiling optical converters 120 that have been fabricated using the methods and apparatus of the present invention. Light guide ribbon structures 80 are preferably fabricated as substantially flat ribbons for ease of stacking. However, secondary operations such as vacuum forming could be employed for further shaping of light guide ribbon structures 80.

Figure 20:
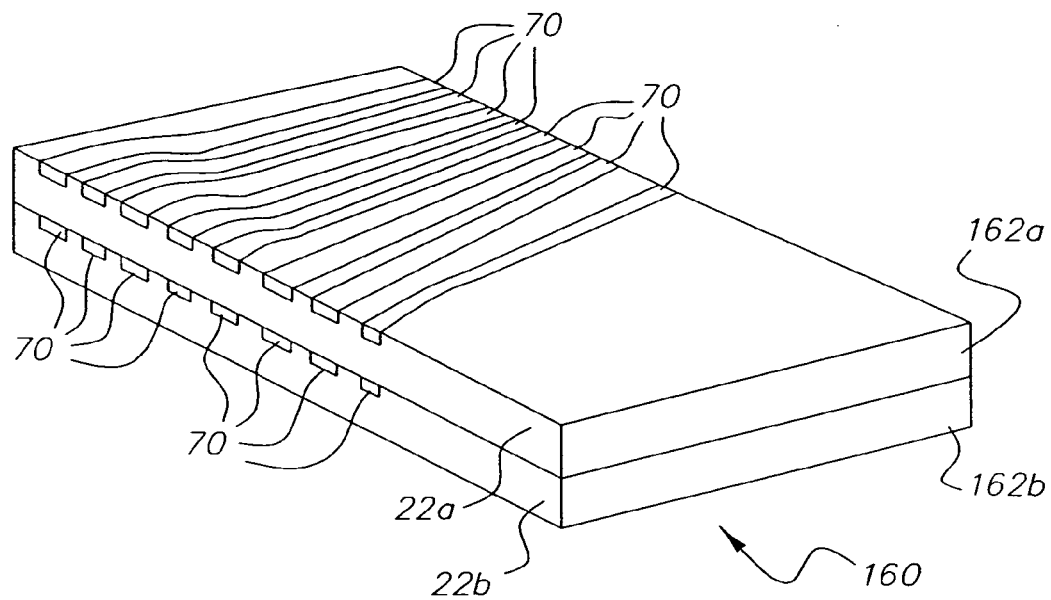
FIG. 20 is a cross-sectional view showing an optional method for providing light guides that operate by reflection; and, FIG. 21 is a perspective view showing a portion of a multilayer light guide ribbon structure in an alternate embodiment.

In the preferred embodiment described above, light guides 70 are provided only on one side of substrate 22. However, light guides 70 could alternately be provided on both sides of substrate 22 and could be aligned or staggered in a number of different configurations on either side. The embodiment shown in FIGS. 11, 12, 13, 14 and 15a through 15d forms and uses light guide ribbon structure 80 in a configuration wherein a single row of light guides 70 is provided. However, the same basic process described for forming light guide ribbon structure 80 could be repeated one or more times to build up a multi layer light guide ribbon structure 160 having a row of light guides 70 in each layer. FIG. 20 shows a multilayer light guide ribbon structure 160 having two layers 162a and 162b. Layer 162b is initially formed onto substrate 22, using the methods described above. Layer 162a is then formed using either a second layer of substrate 22, as shown in FIG. 20, or using an intermediate layer that is coated onto layer 162b, for example. It will be appreciated that an optical converter 120 can be formed using such multilayer light guide ribbon structure 160. This can be done by assembling more than one multilayer guide ribbon structure 160 using the techniques described for assembling light guide ribbon structure 80 to form an optical converter 120.

Alternatively, the process of assembling light guide ribbon structures 80 to form an optical converter 120 can be performed by forming an initial web layer of light guide ribbon structures by the steps of roll molding a web of substrate having a pattern of channels each channel spaced apart from its adjacent channel in accordance with a predefined pattern and coating an optical material into the channels on the web of substrate to form light guides and forming at least one subsequent web layer of light guide ribbon structure 80 on the initial web layer 80 by the steps of roll molding a web of substrate on the initial web layer of light guide ribbon structures, with each subsequent layer having a pattern of channels, each channel spaced apart from its adjacent channel in accordance with a predefined pattern and coating an optical material into the channels on the web of substrate to form light guides. A web thus formed can then be segmented to form an optical converter having an input edge and an output edge with an array of stacked light guides extending therebetween.

Figure 21:
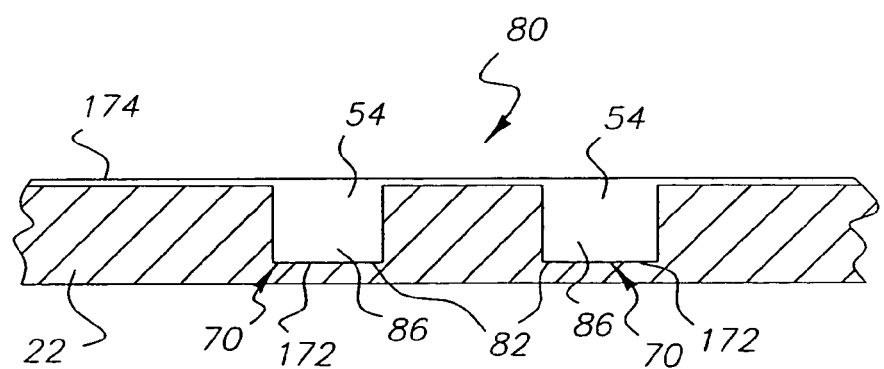

In the embodiments described hereinabove, light guides 70 are described as being formed using optical material 90. Another option is to form one or more reflective light guides 170 in the form of a reflective tube as is shown in the cross-sectional view of FIG. 21. For such an arrangement, one or more channels 54 would be formed and given a reflective coating 172. An optional reflective coating 174 can then be provided as a covering to provide a reflective surface with a reflective light guide 70 constructed in this manner.

Figure 22:
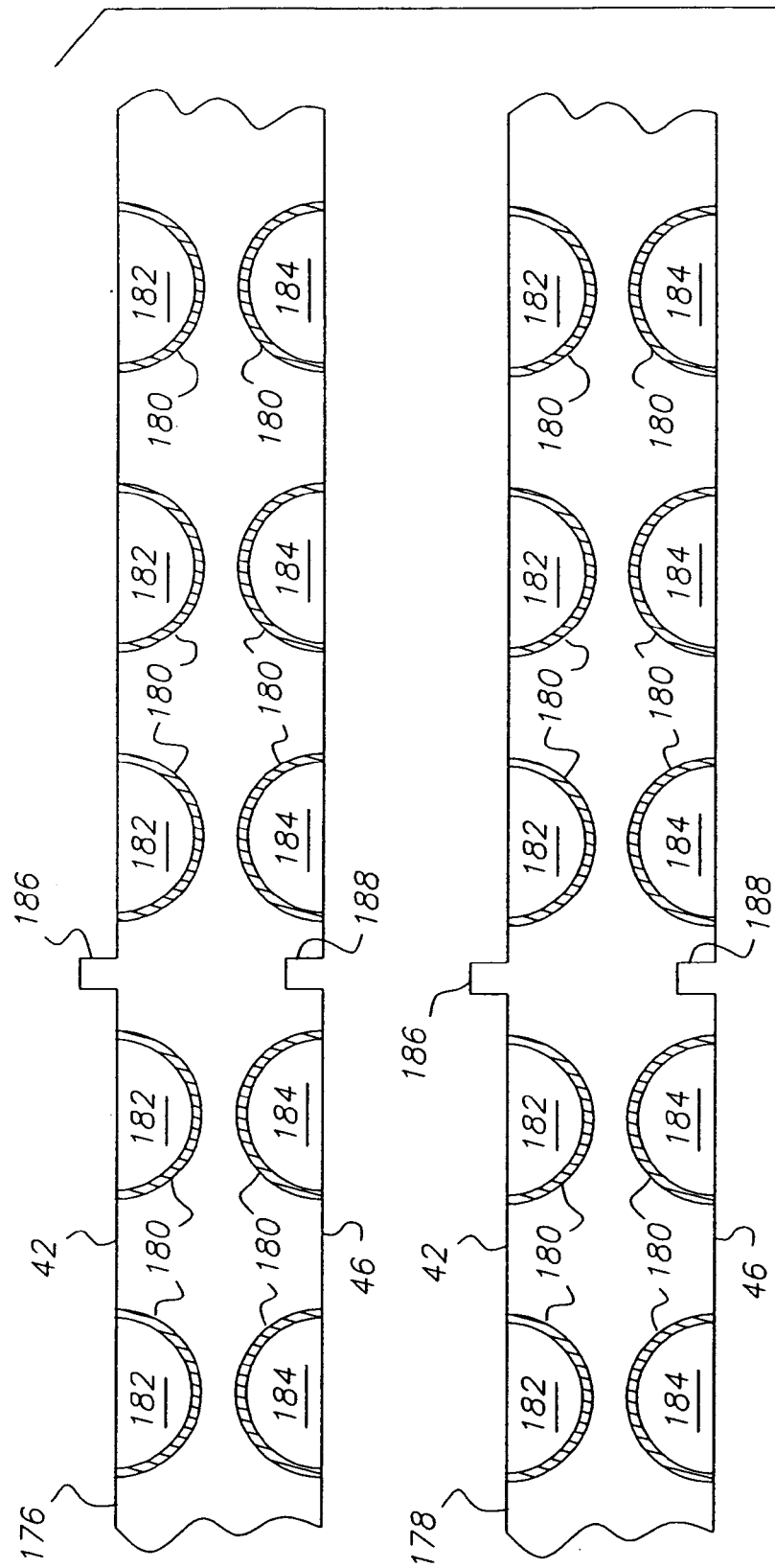
FIG. 22 shows an assembly cross section view of another embodiment of an optical converter.
Figure 23:
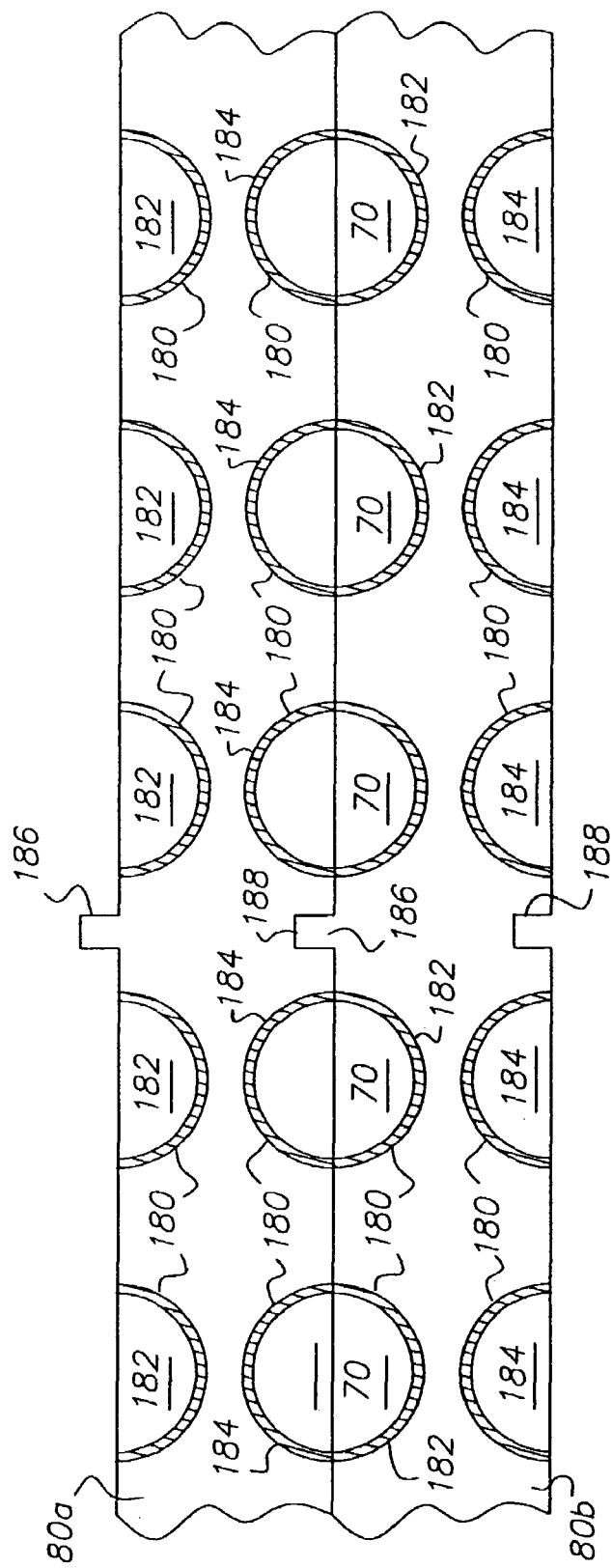
FIG. 23 shows a view of the embodiment of FIG. 22 assembled and in cross section.

Still another embodiment of this type is shown in FIGS. 22 and 23 that show an optical converter 120 that is formed by joining at least two light guide ribbon cables 176 and 178. As is shown in the FIG. 22, light guide ribbon cables 176 and 178 each have a patterned surface 42 and a patterned base surface 46 having channels 182 and 184 respectively formed therein. Each of these light guides has a reflective cladding 180 coated or otherwise provided along channels 182 and 184 to form a reflective surface. In this embodiment, channels 182 and 184 are adapted to cooperate to form light guides 70 when a first light guide ribbon cable 176 and second light guide ribbon cable 178 are joined together. In this embodiment, each light guide ribbon cable 176 and 178 have a patterned surface 42 with an alignment surface 186 and a patterned base surface 46 having an alignment channel 188 adapted to receive alignment surface 186 and to facilitate alignment of each light guide ribbon cable 176 and 178 with respect to each other. In this embodiment, channels 182 and 184 can be formed on base surface 46 by forming a pattern on support 33 shown in FIG. 1 as a pressure roller 34. However, such a pattern can similarly be formed on an alternate embodiment of support 33. Although only one such alignment surface 186 and one such alignment channel are shown on each surface, patterns of more than one can be used.

Figure 24:
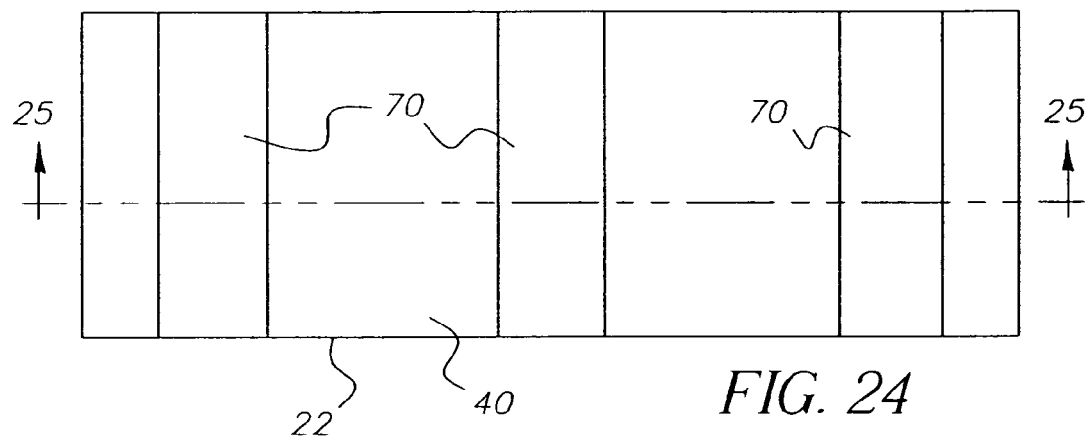
FIG. 24 shows a top view of a substrate having light guides in accordance with one embodiment of the invention.
Figure 25:
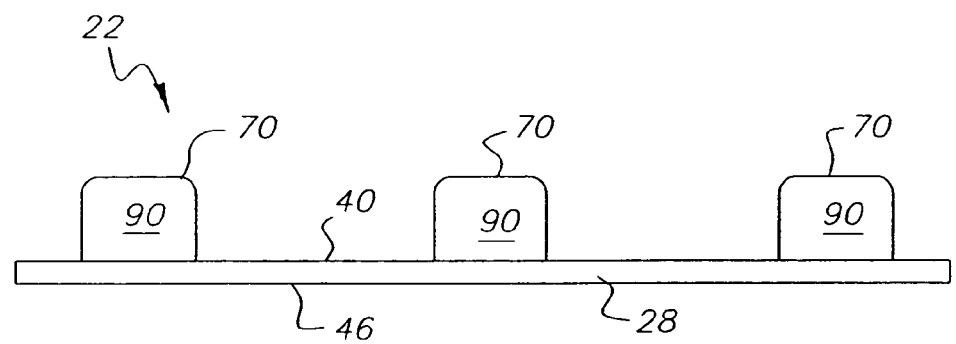
FIG. 25 shows a face view of a substrate of FIG. 24
Figure 26:
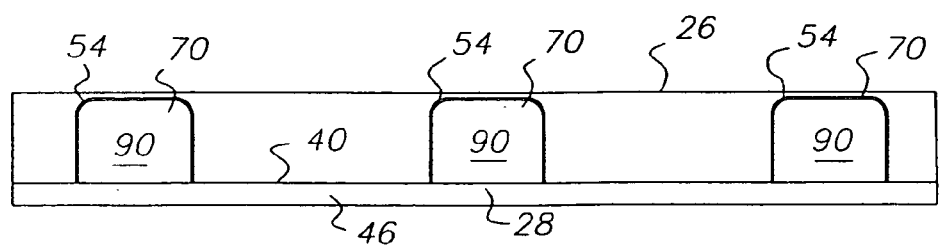
FIG. 26 shows the formation of channels on the substrate of FIGS. 24 and 25.

It will be appreciated that in yet another alternative embodiment, extrusion roll molding apparatus 20 of FIG. 2 can be used to directly form light guides 70 on substrate 22 by reversing the process described above and applying a pattern of optical material 90 to a base 28 using the process described above for applying thermoplastic material 26 to base 28. This forms light guides 70 directly on substrate 22. A top view and cross-section view of such a substrate is shown in FIGS. 24 and 25. It will also be appreciated that, in this embodiment, a thermoplastic material 26 or other material can then be applied to the substrate 22 formed in this fashion using the coating techniques described herein or otherwise known in the art to apply a coating of a thermoplastic material 26 to form channels 54 and a light guide ribbon structure 80 as shown in FIG. 26.

Therefore, what is provided is an improved apparatus and method for forming an optical converter.

The invention has been described in detail with particular reference to certain preferred embodiments thereof, but it will be understood that variations and modifications can be effected within the spirit and scope of the invention.

PARTS LIST

20 Extrusion roll molding apparatus
22 substrate
24 extruder
26 thermoplastic material
28 base
30 base supply roll
32 nip area
33 support
34 pressure roller
36 pattern roller
38 roller pattern
40 channel pattern
42 patterned surface
44 substrate take up roll
46 base surface
50 pattern
52 raised area
54 channel
70 light guide
70a light guide
70b light guide
70c light guide 74 web of substrate
80 light guide ribbon structure
80a light guide ribbon structure
80b light guide ribbon structure
80c light guide ribbon structure
80d light guide ribbon structure
80e light guide ribbon structure
82 group of light guides
86 input edge
88 output edge
90 optical material
94 coating apparatus
96 roll
98 gap
100 roller
102 roller
104 source of optical material
106 web
108 receiver roll
112 coating support
114 skiving mechanism
116 meniscus
120 Optical converter
122 input edge
124 output edge
126a output edges
126b output edge
126c output edge
126d output edge
128 alignment passages
130 alignment pin
142 input edge spacer
144 output edge spacer
146 input edge
148 output edge
160 slits
160 multi layer light guide ribbon structure
162a ribbon structure layer
162b ribbon structure layer
170 reflective light guides
172 reflective coating
174 reflective coating
176 first light guide ribbon structure
178 second light guide ribbon structure
180 reflective cladding
182 channels
184 channels
186 alignment surface
188 alignment channel
$I_g$ input edge guide to guide group distance
$I$ input edge guide-to-guide distance
$W$ width
$O$ output edge guide to guide distance
$C_i$ input edge cut line
$C_o$ output edge cut line
$Q$ curvature
$A_1$ input area
$A_2$ output area

What is claimed is:

1. A method for forming an optical converter comprising:
forming a web of light guide ribbon structures by the steps of roll molding a web of substrate having a pattern of channels, each channel spaced apart from its adjacent channel in accordance with a predefined pattern, and coating an optical material into the channels on the web of substrate to form light guides;
applying a coating to the web of light guide ribbon structures;
segmenting the web of light guide ribbon structures to form individual light guide ribbon structures with each ribbon structure having an input edge and an output edge with light guides extending therebetween; and
assembling the individual light guide ribbon structures in a stacked arrangement;
wherein said coating applied to the light guide ribbon structures provides a spacer between adjacent stacked said light guide ribbon structures, wherein the optical converter has an input edge and an output edge and wherein the spacer is used to provide a separation between the light guide ribbon structures at the input edge that is different from the separation of light guide ribbon structures at the output edge.

2. The method of claim 1, wherein the ratio of said output edge spacing to said input edge spacing exceeds about 1.4.

3. The method of claim 2, wherein the step of roll molding a substrate having a pattern of channels comprises the step of defining a pattern of channels on each side of a substrate.

4. The method of claim 1, wherein said light guide ribbon structures are curved.

5. The method of claim 1, further comprising the step of shaping an end face of at least one said light guides to provide a lens structure.

6. The method of claim 5, wherein the step of shaping an end face of at least one said light guides comprises the step of applying heat to said at least one said light guides.

7. A method for forming an optical converter comprising:
forming a web of light guide ribbon structures by the steps of roll molding a web of substrate having a pattern of channels, each channel spaced apart from its adjacent channel in accordance with a predefined pattern, and coating an optical material into the channels on the web of substrate to form light guides;
segmenting the web of light guide ribbon structures to form individual light guide ribbon structures with each ribbon structure having an input edge and an output edge with light guides extending therebetween; and
assembling the individual light guide ribbon structures in a stacked arrangement,
wherein a thickness dimension at said input edge of said substrate differs from a thickness dimension at said output edge of said substrate.

8. A method for forming an optical converter comprising:
forming a web of light guide ribbon structures by the steps of roll molding a web of substrate having a pattern of channels, each channel spaced apart from its adjacent channel in accordance with a predefined pattern, and coating an optical material into the channels on the web of substrate to form light guides;
segmenting the web of light guide ribbon structures to form individual light guide ribbon structures with each ribbon structure having an input edge and an output edge with light guides extending therebetween; and
assembling the individual light guide ribbon structures in a stacked arrangement,
wherein at least one said light guide ribbon structure has a plurality of inputs.

9. A method for forming an optical converter comprising:
forming a web of light guide ribbon structures by the steps of roll molding a web of substrate having a pattern of channels, each channel spaced apart from its adjacent channel in accordance with a predefined pattern, and coating an optical material into the channels on the web of substrate to form light guides;

segmenting the web of light guide ribbon structures to form individual light guide ribbon structures with each ribbon structure having an input edge and an output edge with light guides extending therebetween; and assembling the individual light guide ribbon structures in a stacked arrangement, wherein at least one said light guide ribbon structure has a plurality of outputs.

* * * * *